(12) United States Patent
Justesen et al.

(10) Patent No.: US 11,000,786 B2
(45) Date of Patent: May 11, 2021

(54) DYNAMIC PLATE PACK FOR SOIL EXTRUSION SYSTEM

(71) Applicant: Southern Fabrication Works, LLC, Burley, ID (US)

(72) Inventors: M. Neil Justesen, Burley, ID (US); Fred Leoni, Burley, ID (US); James Claude Murphy, Burley, ID (US)

(73) Assignee: SOUTHERN FABRICATION WORKS, Burley, ID (US)

( * ) Notice: Subject to any disclaimer, the term of this patent is extended or adjusted under 35 U.S.C. 154(b) by 74 days.

(21) Appl. No.: 16/174,012

(22) Filed: Oct. 29, 2018

(65) Prior Publication Data
US 2019/0201814 A1 Jul. 4, 2019

Related U.S. Application Data

(63) Continuation-in-part of application No. 15/067,525, filed on Mar. 11, 2016, now Pat. No. 10,112,126.

(51) Int. Cl.
*B01D 21/34* (2006.01)
*B01D 21/24* (2006.01)
(Continued)

(52) U.S. Cl.
CPC ..... *B01D 21/2461* (2013.01); *B01D 21/0003* (2013.01); *B01D 21/0012* (2013.01);
(Continued)

(58) Field of Classification Search
None
See application file for complete search history.

(56) References Cited

U.S. PATENT DOCUMENTS 7,850,860 B2 * 12/2010 Dissinger ........... B01D 21/0045
    210/802
9,782,697 B2 * 10/2017 Lewis ................ B01D 21/0003
    (Continued)

FOREIGN PATENT DOCUMENTS

CN          204973334 U  *  1/2016

OTHER PUBLICATIONS

Southern Fabrication Works, Solids Removal with Plate Pack, https://southernfabricationworks.com/processing-systems/soil-extraction/solids-removal/, (downloaded 9/85/2020) (Year: 2020).*

(Continued)

*Primary Examiner* — Chester T Barry
(74) *Attorney, Agent, or Firm* — Burdick Patents, P.A.; Sean D. Burdick

(57) ABSTRACT

An extrusion system for separating particulates entrained in wash water, e.g. from harvesting tuberous produce, includes a settling tank configured to receive a flow of particulated water. A diffuser suspended within the tank converts the flow of particulated water into multiple transverse flows to avoid churning settled particulates. A particulate filter fixed within the tank includes a central channel surrounded by a cylindrical array of cantilevered parallel vertical blades. The channel directs the flows below the blades, causing dynamic movement of the blades as the particulated water rises therebetween to trap particulates along boundary layers, promote particulate settling by gravity, and allow clarified water to rise to the top of the tank. A sensor detects settled particulate reaching a predetermined setpoint, and in response the system actuates an auger and opens a pinch valve to force concentrated particulate from the bottom of the tank.

8 Claims, 31 Drawing Sheets

(51) Int. Cl.
*B01D 21/00* (2006.01)
*C02F 1/00* (2006.01)

(52) U.S. Cl.
CPC ..... *B01D 21/0024* (2013.01); *B01D 21/0042* (2013.01); *B01D 21/0045* (2013.01); *B01D 21/2427* (2013.01); *B01D 21/34* (2013.01); *C02F 1/001* (2013.01); *B01D 21/0006* (2013.01); *B01D 21/0087* (2013.01); *C02F 2001/007* (2013.01)

(56) References Cited

U.S. PATENT DOCUMENTS

| 10,786,760 B2 * | 9/2020 | Anastasio | ............... B01D 21/30 |
| 2017/0259193 A1 * | 9/2017 | Justesen | ............. B01D 21/0024 |

OTHER PUBLICATIONS

Southern Fabrication Works, Soil Extraction System without Plate Pack, https://southernfabricationworks.com/processing-systems/soil-extraction/soil-extractor/ (downloaded Sep. 8, 2020) (Year: 2020).*

* cited by examiner

SECTION A-A

SECTION B-B

SECTION B' - B'

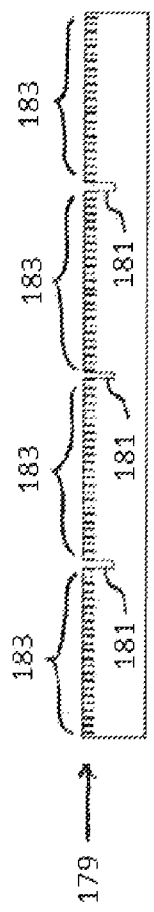
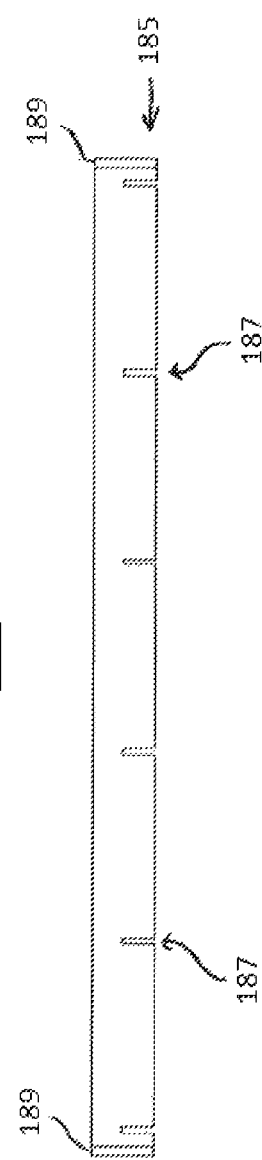
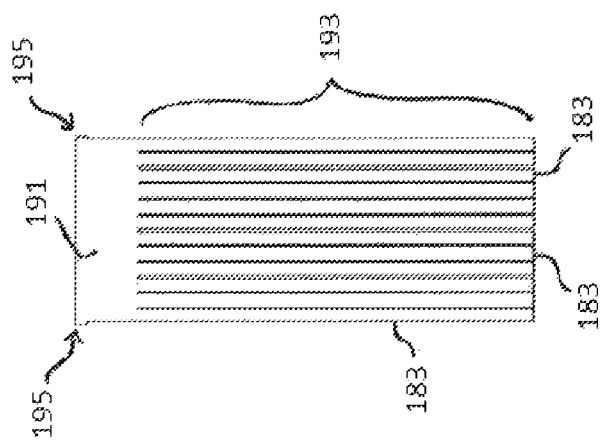
FIG. 31
FIG. 32
FIG. 33

DYNAMIC PLATE PACK FOR SOIL EXTRUSION SYSTEM

RELATED APPLICATIONS

This application is a continuation-in-part of, and claims priority to, U.S. patent application Ser. No. 15/067,525, which was filed on Mar. 11, 2016, now U.S. Pat. No. 10,112,126, and which is fully incorporated herein by reference.

BACKGROUND OF THE INVENTION

Field of the Invention

The present invention relates generally to systems and methods for separating soil from water, and particularly to such systems employed in agriculture for processing soiled water that is generated as a byproduct of cleaning harvested crops such as tuberous vegetables or other applications where soiled water contains large quantities of relatively heavy suspended solids.

Description of Related Art

About three weeks prior to harvest, potato fields are maintained at maximum saturated water conditions, which has the effect of producing larger potatoes for harvest. It also produces mud and dirt clods, so that when the potatoes are dug from the ground using a draper digging chain, a significant amount of mud and stones are collected along with the potatoes. This unwanted debris is transported along with the harvested crop, and must be eventually removed through further processing. Similar problems occur in any root crop harvest.

A number of methods and apparatus exist in the prior art for removing dirt from products mined or harvested from the earth, such as potatoes and like tuberous plants. Generally, these methods wash dirt from the product by immersion in flowing water or by subjecting the product to a pressurized water spray in a wash compartment or as it moves along a flow channel or conveyor belt. These methods create large volumes of dirty water as a byproduct that must be subjected to further treatment to recycle a portion of the water for use in the upstream washing process, or to clarify the water before returning it to its source or introducing it into a municipal wastewater stream. Known methods for large-scale clarification of water include the use of gravity to collect dirt at the bottom of a settling tank, and the use of centrifugal force to separate dirt and other solids at a flow perimeter. One persistent problem that is largely unaddressed by these methods is how to efficiently dispose of sludge that accumulates in the settling tank or other areas of the clarifying system.

For example, settling tank systems for clarifying wastewater are known to include inner sides converging to a partition through which mud and large particles accumulate by gravity. Conveyance means such as a chain of perforated buckets have been proposed that pass through the well to collect the mud and release water during ascent, eventually dumping the mud into a forgotten pile when the buckets turn over. These systems equip the settling tank with openings through which the tank must be periodically emptied and drained, or manholes through which the tank may be entered for manual cleaning. These are messy, time-consuming tasks, and no solution is provided for removing the dumped mud.

Another system proposes a sedimentation tank equipped with a trough running around its upper perimeter. Dirty water from a revolving drum of a potato washer enters the trough, which has overflow drains at different vertical levels that allow cleaner water to drain into the tank while heavier sediment settles in the trough. The cleaner water is recirculated to the drum; however, the trough must be periodically cleaned by manually scraping out the slurry and muddy sediment, and the tank must also be manually flushed through a special opening provided for that purpose.

Another system proposes to reclaim water used to clean vegetables in a multi-stage spraying process. A first stage sprays off the majority of dirt and directs the resulting dirty water away from the system. A second stage subjects the vegetables to further spray recirculated through a settling tank. A third stage sprays the vegetables with fresh water that replenishes the settling tank. The settling tank has multiple sections separated by vertical baffles, each baffle allowing overflow into a succeeding section so that the cleanest water accumulates in the section furthest from the inlet while sediment accumulates in the bottom of the tank. Second-stage water is recirculated from the furthest section of the tank. Plugs are provided at the bottom of each tank section to facilitate an inefficient, labor-intensive manual removal of accumulated sludge. No solution is provided for clarifying wastewater generated by the first stage.

Another washing system with the help of gravity directs potatoes through a sloped serpentine flume to mechanically loosen and remove dirt prior to spraying. The system produces a muddy waste stream that must be routed to a specialized filtration system for further processing. The system suffers an inherent inefficiency, because the waste stream must be kept sufficiently fluid to entrain solids and prevent muddy buildup, criteria that is contrary to the objective of separating water from soil.

Dishwashing apparatus address a similar problem. In one such exemplary system, the dishwasher circulates water through rotary sprayers to remove food particles and soil. These particles become entrained in the water and are centrifugally separated by action of a separator and collected in an accumulator while the water is recirculated. To drain the dishwasher, a valve is opened to flush the contents of the accumulator through the main drain. Due to relatively high power consumption, and because it ultimately recombines the soil and water, the system is not suitable for clarifying water in a large-scale harvesting process.

More recent systems in this field utilize gravity and centrifugal action of water. These systems propose loading a root crop into a conical separator which directs the crop and overflow water to a rotatable washing drum. Water exiting the drum is pumped back into the separator with sufficient force to support the crop and loosen mud and other debris that fall by force of gravity toward a waste outlet at the bottom, or alternatively, the drum is provided with perforations for filtering out dirt and other particles and entraining them in an auxiliary flow. While these systems clarify the soiled water to some degree, an efficient means for disposing of the collected soil is largely unaddressed. One system proposes a conveyor that runs beneath the waste outlet; however, the collected debris is simply dumped into a pile at a far end of the apparatus, and no solution is provided for replenishing the trough with water to replace significant volumes lost through the waste outlet along with the solid debris. Another of these systems proposes a multi-celled wheel that collects waste slurry from the drum into the cells. The system rotates the wheel in response to sensing an increased cell density so that cells containing the densest slurry are positioned for discharging their contents; however, no means is provided to effect the discharge.

What is needed is an automated and efficient water clarification system scalable for a large harvesting operation that removes concentrated soil from wash water without generating slurry as a byproduct. Although the present invention was originally developed in the context of removing soil and other suspended solids from waste water in the context of food processing, it should be apparent to those skilled in the art that the below described and claimed invention can be used for other applications as well.

SUMMARY OF THE INVENTION

The present invention discloses exemplary embodiments for an extrusion system and related method for separating soil from water. The invention has generic application in any water clarification system, and has particular application in agriculture processing for clarifying recirculated wash water used for processing a harvest of tuberous root vegetables. The invention overcomes clogging and drainage problems inherent in prior art systems by promoting the formation of concentrated mud to facilitate extrusion of the soil and improve water clarity.

A system of the invention may include a settling tank configured for receiving soiled water, separating the soil from the water, and outputting clarified water and concentrated soil. The clarified water may be used as wash water and recirculated to a crop-washing system. The concentrated soil may be collected at the bottom of settling tank as a thick mud and from there conveyed to any desired location.

The settling tank and its major structural components are preferably manufactured from structural steel and treated with an appropriate environmentally resistant coating. The settling tank is generally conical in shape, so that it converges from its widest opening at the top to its narrowest opening at the bottom. The settling tank may have an inverted frusto-conical shape, or it may have an upper cylindrical portion connected to a lower frusto-conical portion. The general configuration of settling tank is a vessel having an opening at the top and sloping sides that converge upon a smaller diameter opening at the bottom.

Structural supports provide a framework for supporting the settling tank so that the lower opening is elevated a few feet above ground. Crossbars run transversely across a central area near the top of the settling tank to support an instrument platform and a diffuser. The instrument platform provides a stable mounting location for other system components, such as motors, a level sensor, and associated cables, switches, and electronic controls. Optional drain lines may be plumbed into the side of the settling tank for periodic flushing or maintenance.

During operation of the extrusion system, the lower opening is initially closed by means of a pinch valve. Soiled water is pumped into the settling tank through an inlet to an inlet filter, which filters out large bits of organic matter and other solid debris. The inlet filter may be configured as a rotary screener that has a generally cylindrical interior with a concentric helical baffle running along the inner wall and extending radially therein. An electric motor may be mechanically linked to the rotary screener. When the screener rotates, the soiled water passes through the rotating helical baffle, which catches larger-sized organic solids and entrained root materials and pushes them out of the screener by means of the rotating helix. A spray bar may be positioned adjacent to the inlet filter to direct a high-pressure fresh water spray into the rotary screener to dislodge organic matter and prevent clogging.

The soiled water exits the inlet filter at the approximate center of the top opening of settling tank, where it is directed downward by a drain pan into a diffuser. The diffuser provides a means for directing particulated water that enters the settling tank to an intermediate elevation below the top of the settling tank. The diffuser may be configured with a lower horizontal baffle and a plurality of ports located above the horizontal baffle. The diffuser may be suspended from the crossbars or other structural components so that it extends to the interior of the settling tank, placing the horizontal baffle at an elevation between the upper and lower openings of the tank. The baffle may be placed approximately midway between the upper and lower openings. Each of the ports defines an opening through a vertical wall of the diffuser. Downward flow of soiled water impacts the baffle and is redirected at right angles through the ports to form multiple transverse flows. During steady-state operation, the ports and baffle are immersed inside the tank, so that soiled water exiting the ports encounters a largely static, standing mass of water. The diffuser slows the soiled water, discouraging turbulence, and deflects the flow away from settled soil that accumulates in the bottom of the settling tank.

As soiled water exits the diffuser and mixes into the standing mass of water, the settling tank promotes separation of the soil that is entrained in the water by allowing gravity to concentrate heavier solids at its lower depths, which causes a more clarified water to accumulate at the surface. As the level of settled soil rises, the level of clarified water rises to the top of the tank. Lighter particulate matter will rise with the clarified water. Filtration of the lighter particulate matter is effected by means of a plate pack particulate filter (or "plate pack"). The plate pack is generally cylindrical in form and is fixed within the settling tank at an elevation beneath the diffuser at an intermediate location within the settling tank. The plate pack defines a channel that extends vertically through the center of the plate pack to accommodate the diffuser. In one embodiment, the channel is generally conical, having a maximum inner diameter about twice that of its minimum inner diameter. In operation, the channel receives particulated water from multiple transverse flows exiting the diffuser, and further directs the flows downward through the plate pack.

Particulated water exits the channel at low velocity and mixes with water that has accumulated in the tank. While some of the particulate entrained in flow settles toward the bottom of the tank, other particles, especially the smaller and lighter particles, remain entrained in the flow as it is forced slowly upward through the plate pack. The plate pack directs the upward flow through a plurality of narrow channels that are typically formed in the spaces between closely stacked parallel plates. At low velocity, the flow is laminar, such that boundary layers of zero or near-zero velocity occur along the surfaces of the plates. Particles that are entrained in the flow through these narrow channels contact the boundary layer and tend to become trapped on the plate surface. According to the invention, the plate pack is configured so that the angle of the plate surface with respect to horizontal exceeds the angle of repose for a particle or class of particles which are to be separated from water that rises to the top of the tank. Those particles, trapped along the boundary layer, will then gradually slip downward or sink along the plate surface under force of gravity, and eventually settle at the bottom of the tank.

Various configurations for plate pack particulate filters are disclosed. These include: a plate pack consisting of a cylindrical array of conical coaxial parallel plates; a plate pack consisting of a cylindrical array of radially aligned undulating vertical plates; a plate pack consisting of a cylindrical array of radially aligned parabolically curved vertical plates; a plate pack consisting of a cylindrical array of radially aligned slanted capillary tube stacks; a plate pack consisting of a cylindrical array of concentric corrugated vertical plates; a plate pack consisting of a cylindrical array of conical coaxial corrugated plates; and a dynamic plate pack consisting of a cylindrical array of cantilevered parallel vertical blades. The dynamic plate pack emulates the filtration action of undulating blades of grass that trap and sink tiny airborne particulate matter such as grit and sand that collect in dew drops that form on grass.

The settling tank may be equipped with a weir at its upper perimeter, configured so that rising water will spill into the weir without departing the settling tank. A clean water collector is located at the periphery of the settling tank to drain the weir. The drain may be configured for connection to external piping to provide a means for directing overflow water out of the settling tank to a desired location.

During operation, the settled soil accumulates in the bottom of the settling tank, so that the densest concentration of the soil occurs immediately above the lower opening. The soil in this area is suitable for removal by extrusion. When the level of the settled soil reaches a predetermined height, the system actuates a soil discharge by opening the pinch valve and rotating a motor-driven auger. The auger extends vertically from the instrument platform down the central axis of the settling tank to the lower opening. Rotation of the auger pushes the most heavily concentrated soil through the lower opening and the pinch valve. Masses of concentrated soil are thereby extruded through the pinch valve where they may be collected for further conveyance. The soil discharge may cease when the level of the settled soil falls to a minimum height or when the auger has been rotated for a predetermined time.

Feedback control may be used to automate the soil discharge. For example, the system may be equipped with a level sensor for sensing the level of the settled soil. In response to settled soil level reaching a maximum setpoint, the system starts the auger motor and opens the pinch valve. In response to settled soil level reaching a minimum setpoint, the system stops the auger motor and closes the pinch valve. Alternatively, the system may stop the auger motor and close the pinch valve when a predetermined time period elapses.

In another embodiment, a system for separating particulate from water includes a settling tank configured for receiving particulated water and allowing particulate to settle at a bottom of the settling tank, a means for directing the particulated water into the settling tank to an intermediate elevation below a top of the settling tank, a particulate filter in the form of a plate pack fixed within the settling tank and located at an elevation beneath the directing means, a means for sensing settled particulate level above the bottom of the settling tank, and a means for extruding settled particulate from the bottom of the settling tank responsive to sensed settled particulate level achieving a predetermined setpoint. The plate pack may be formed as a cylindrical array of a plurality of dynamically cantilevered parallel vertical plates, the plate pack including a channel extending vertically through the cylindrical array for directing particulated water to an elevation below the plates to allow the particulated water to rise therebetween to trap particulates along boundary layers, promote particulate settling by gravity, and allow clarified water to rise to the top of the tank. In another embodiment, the dynamic plate pack includes an outer support ring, a plurality of bearing bars, wherein at least one end of each bearing bar is fixed to the outer support ring, and a plurality of plates, each plate having an upper end and a lower end, wherein the upper end of each plate is fixed to at least one bearing bar and wherein the lower end of each plate is unrestrained.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. Dimensions shown are exemplary only. In the drawings, like reference numerals may designate like parts throughout the different views, wherein:

FIG. 18A is a magnified view of a portion of FIG. 18.

FIG. 31 is a side view of a bearing bar used in the construction of the dynamic plate pack particulate filter of FIG. 26.

FIG. 32 is a side view of a cross bar used in the construction of the dynamic plate pack particulate filter of FIG. 26.

FIG. 33 is a side view of a multiply-bladed plate used in the construction of the dynamic plate pack particulate filter of FIG. 26.

DETAILED DESCRIPTION OF THE INVENTION

This disclosure presents exemplary embodiments for an extrusion system and related method for separating soil from water. The invention has generic application in any water clarification system, but to best illustrate certain features and benefits of the invention, the disclosure focuses primarily on specific agricultural applications, namely, clarifying recirculated wash water used for processing a harvest of tuberous root vegetables such as potatoes, beets, turnips, and carrots. In these and other applications, it is an object of the invention to provide a system for in situ soil reconcentration that obviates difficulties arising from prior systems that transport muddy water over long distances. It is a further object of the invention to improve the overall clarity of water that is output from the system. Another object of the invention is to significantly reduce dependency on manual labor for cleaning sludge that accumulates in various locations within the system, and to improve overall system efficiency in general.

Figure 1:
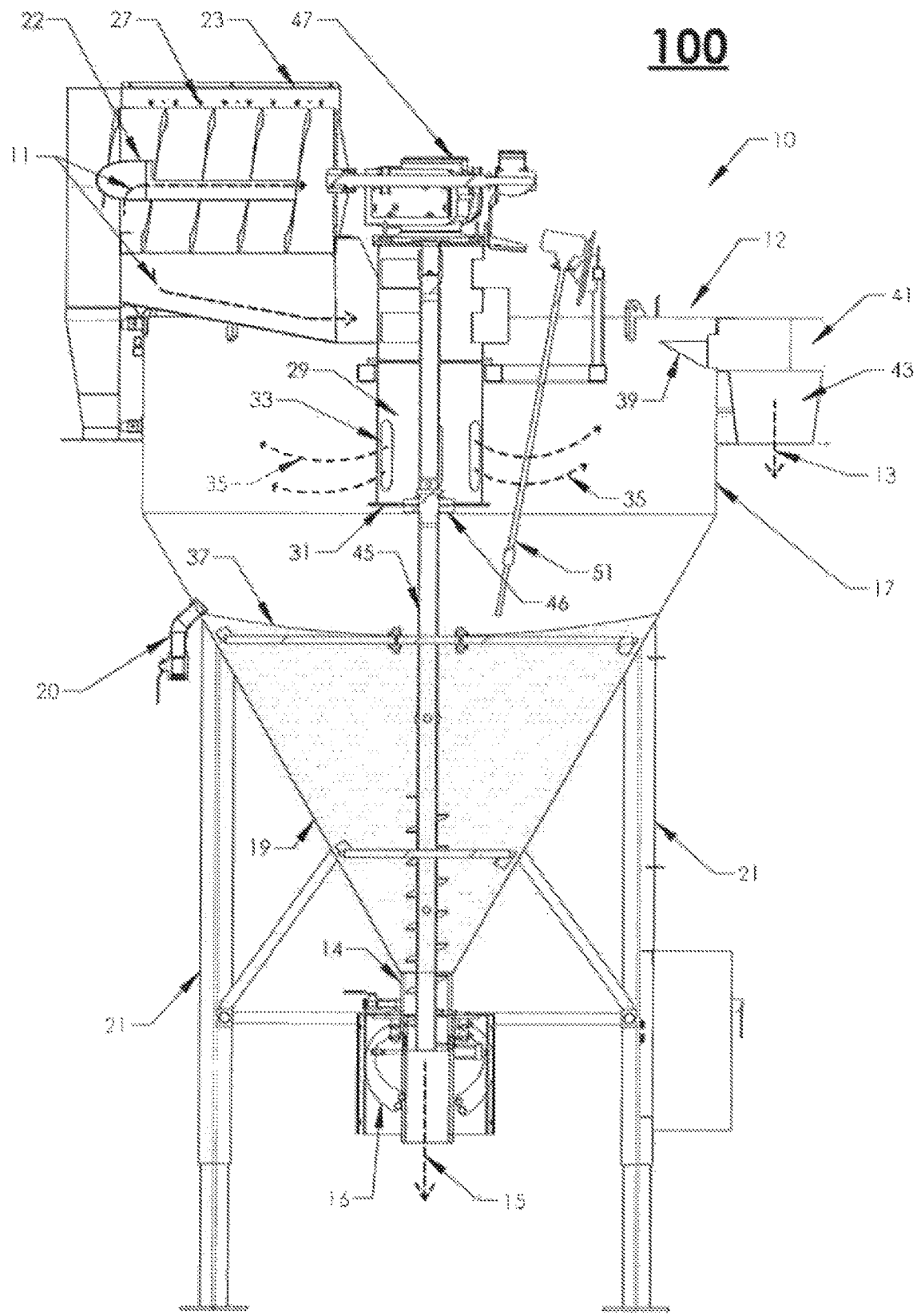
FIG. 1 is a partial cutaway view of one embodiment of an extrusion system according to the invention, during operation.

FIG. 1 shows a partial cutaway view of one embodiment of an extrusion system 100 according to the invention in a state of operation. System 100 includes a settling tank 10 configured for receiving soiled water 11, separating the soil from the water, and outputting clarified water 13 and concentrated soil 15. The clarified water 13 may be used as wash water and recirculated to a crop-washing system, to be illustrated further below with reference to FIG. 8. The concentrated soil 15 may be collected at the bottom of settling tank 10 as clumped masses of dirt and clay and from there conveyed to any desired location.

Settling tank 10 and its major structural components may be manufactured from stainless steel, or from structural steel treated with an appropriate environmentally resistant coating, such as an epoxy-based paint and appropriate primer and finishing layers. The settling tank 10 is generally conical in shape, so that it converges from its widest opening at the top to its narrowest opening at the bottom. In one embodiment, the settling tank 10 has an inverted frusto-conical shape. In another embodiment, as shown in FIG. 1, the settling tank 10 has an upper cylindrical portion 17 connected to a lower frusto-conical portion 19. It should be understood by skilled artisans that the foregoing structural descriptions do not represent absolute geometric limitations on tank design, but rather general appearances. The construction of large apparatus such as the settling tank may be effected preferably by welding together multiple curved or planar steel plates, which may produce a multi-sided structure rather than a vessel having continuous curvature about its perimeter. However constructed, the general configuration of settling tank 10 is a vessel having an opening 12 at the top and sloping sides that converge upon a smaller diameter opening 14 at the bottom. In one exemplary embodiment, the top opening 12 has a diameter of about eight feet, and the lower opening 14 has a diameter of about eight inches. These dimensions are exemplary only, as the settling tank and its associated components may be scaled according to need.

Reference is now made to FIGS. 1 to 6 to describe further features of the invention. As shown throughout these figures, structural supports 21 provide a framework for supporting the settling tank 10 so that the lower opening 14 is elevated about two to three feet above ground. Crossbars 30 run transversely across a central area near the top of the settling tank 10 to support an instrument platform 18 and a diffuser 29. The instrument platform 18 provides a stable mounting location for other system components, such as motors 25 and 47, level sensor 51, and associated cables, switches, and electronics. One or more optional drain lines 20 may be plumbed into the side of the settling tank 10 for periodic flushing or maintenance.

During operation of the extrusion system 100, the lower opening 14 is initially closed by means of a pinch valve 16. Soiled water 11 is pumped into the settling tank 10 through an inlet 22 to an inlet filter 23, which filters out large bits of organic matter and other solid debris. In one embodiment, the inlet filter 23 is configured as a helical filter, or rotary screener, that has a generally cylindrical interior with a concentric helical baffle 24 running along the inner wall and extending radially therein. The electric motor 25 (FIG. 3), for example a ¼ hp motor, may be mechanically linked to the rotary screener. When the screener rotates, the soiled water 11 passes through the rotating helical baffle, which catches larger-sized organic solids and entrained root materials and pushes them out of the screener by means of the rotating helix. A spray bar 27 may be positioned adjacent to the inlet filter 23 to direct a high-pressure fresh water spray into the rotary screener to dislodge organic matter and prevent clogging. The soiled water collects in a drain pan 28 (FIG. 4) located below the inlet filter 23.

The soiled water 11 exits the inlet filter 23 at the approximate center of the top opening 12 of settling tank 10, where it is directed downward by the drain pan 28 into a diffuser 29. In one embodiment, the diffuser 29 is configured with a lower horizontal baffle 31 and a plurality of ports 33 located above the horizontal baffle 31. The diffuser 29 is suspended from the crossbars 30 or other structural components so that it extends to the interior of the settling tank 11, placing the horizontal baffle at an elevation between the upper and lower openings of the tank. In one embodiment, the baffle is placed approximately midway between the upper and lower openings. Each of the ports 33 defines an opening through a vertical wall of the diffuser 29. This configuration causes the downward flow of soiled water 11 to impact the baffle 31 and be redirected at right angles through the ports 33 into multiple transverse flows 35. During steady-state operation of the system, the settling tank 10 will be full to capacity. In this state ports 33 and baffle 31 are immersed inside the tank, so that soiled water 11 exiting the ports 33 encounters a largely static, standing mass of water. The diffuser 29 thereby causes a reduction in the velocity of the soiled water 11, discouraging turbulence, and deflecting the flow away from settled soil 37 that accumulates in the bottom of the tank.

As soiled water 11 exits the diffuser 29 and mixes into the standing mass of water, a natural settling of the soil begins to take place. That is, the settling tank 10 promotes separation of the soil that is entrained in the water by allowing gravity to concentrate heavier solids at its lower depths, which causes a more clarified water to accumulate at the surface. Gradually, the level of settled soil 37 increases, as the level of clarified water rises. Eventually, the clarified water will begin to overflow the tank. To direct this overflow, the settling tank 10 is equipped with a weir 39 located just below the top opening 12. In one embodiment, weir 39 comprises an open-topped cup or scoop-shaped device located on one side of the settling tank and projecting inward, as shown in FIG. 1. In another embodiment, weir 39 runs 360 degrees around the upper perimeter of the tank, and comprises a circular channel having a rectangular or triangular cross-section with an open top, an outer side defined by the side of the settling tank, and an inner side opposite the outer side and projecting upward. In the triangular cross-sectional embodiment, the inner side of the channel slants upward from the outer side. In the rectangular cross-sectional embodiment, the channel includes a bottom surface projecting inward from the outer side, and the inner side of the channel projects straight upward. In any embodiment, the top of the innermost projection of the weir 39 rests some distance (e.g. about six inches) below the top opening 12, so that rising water will enter the weir 39 without overflowing the settling tank 10. A clean water collector 41 may be mounted at one or more locations about the periphery of the settling tank. The clean water collector 41 is configured for fluid communication with the weir 39 and with an underlying drain 43. The drain 43 is located adjacent to an outer wall of the settling tank 10. The drain 43 is preferably configured for connection to external piping to provide a means for directing water from the weir out of the settling tank to a desired location.

As operation continues, the settled soil 37 continues to accumulate in the bottom of the settling tank. The sloping sides of the settling tank 10 and hydrostatic pressures cause densest concentration of the soil to occur in an area immediately above the lower opening 14. The soil in this area is thick and viscous and advantageously suitable for removal by extrusion according to the invention.

When the level of the settled soil 37 reaches a certain height predetermined by the system operator to be a maximum desired height, or setpoint, system 100 actuates a soil discharge. During a soil discharge, the pinch valve 16 is opened and an auger 45 is rotated. The auger 45 extends vertically from the instrument platform 18 down the central axis of the settling tank 10 to the lower opening 14. In one embodiment, the auger 45 runs through the center of the diffuser 29. For example, the diffuser may be generally cylindrical in shape, and a cylindrical shaft of the auger 45 may be concentrically oriented within the diffuser and supported therein by a bearing 46 mounted to the lower end of the diffuser. In this configuration, the auger shaft itself provides a barrier for deflecting soiled water 11 that enters the diffuser 29, thereby aiding the diffusing process. The auger 45 is mechanically linked to motor 47 through an auger drive unit 59 that is equipped with bevel gears or other mechanical linkage necessary for motor 47 to drive the auger 45 about a vertical axis of rotation. Rotation of the auger 45 in this manner pushes the most heavily concentrated soil through the lower opening 14 and the pinch valve 16. Clumped-together masses of concentrated soil 15 are thereby extruded through the pinch valve 16 where they may be collected for further conveyance, for example, for orderly compact disposal, or to replenish the vegetable field. The soil discharge may cease when the level of the settled soil 37 falls to a certain height predetermined by the system operator to be a minimum desired setpoint, or when the auger 45 has been rotated for a predetermined amount of time.

To automate the soil discharge feature, system 100 may be equipped with a level sensor 51 for sensing the level of the settled soil 37 and causing actuation of the motor 47 that is coupled to the auger 45. There are a variety of known technologies for sensing the level of a solid, any of which may be employed as level sensor 51. For example, capacitive sensors, radar transmitters, ultrasonic transmitters, pressure sensors, and displacement sensors may be used for this purpose. In one illustrative embodiment, level sensor 51 comprises a displacement sensor mounted above the top opening 12 and extending into the settling tank to a depth where it can sense settled soil level achieving the maximum or minimum predetermined setpoints. When the settled soil level reaches the maximum setpoint, the level sensor 51 outputs an actuation signal directly to the motor 47, or indirectly to the motor 47 through electronic controls. The same actuation signal may cause actuation of the pinch valve 16 to open. Conversely, after the auger 45 has operated for some period of time and the settled soil level reaches the minimum setpoint, the level sensor 51 outputs another actuation signal which directly or indirectly causes the motor 47 to stop. The same actuation signal may cause actuation of the pinch valve 16 to close. Feedback control schemes such as these are well known in the art and need no further elaboration.

Figure 2:
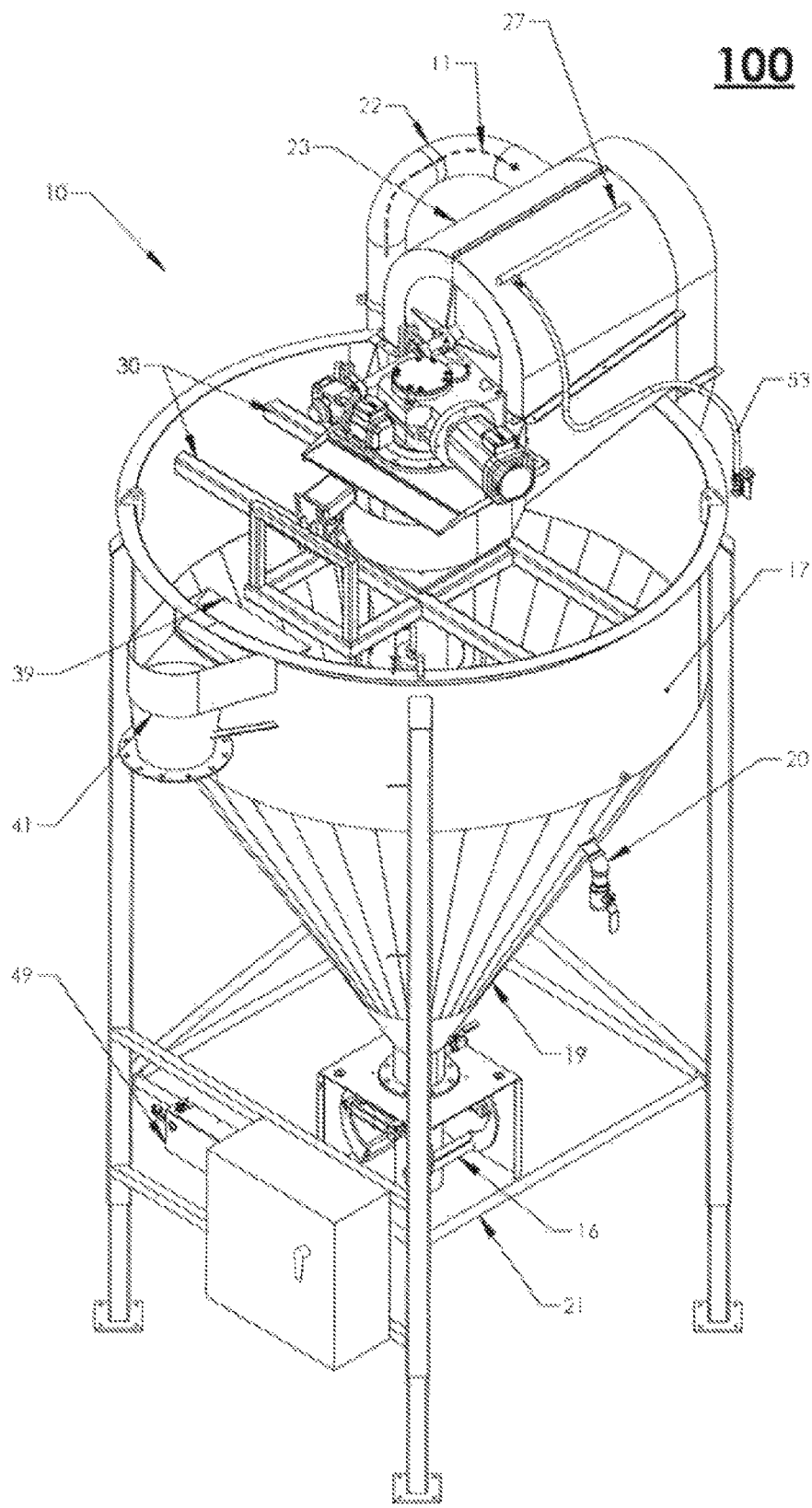
FIG. 2 is a perspective view of one embodiment of an extrusion system according to the invention for separating soil from water.

FIG. 2 shows a perspective view of the extrusion system. In particular, this view illustrates an embodiment of the invention wherein the setting tank is constructed by welding together multiple trapezoidal segments of steel plate to form the lower frusto-conical portion 19. Weir 39 and clean water collector 41 are visible in this view. A pneumatic controller 49 for actuating the pinch valve 16 is mounted to one of the structural supports 21. A fresh water line 53 provides a supply of fresh water to the spray bar 27 mounted atop the inlet filter 23.

Figure 3:
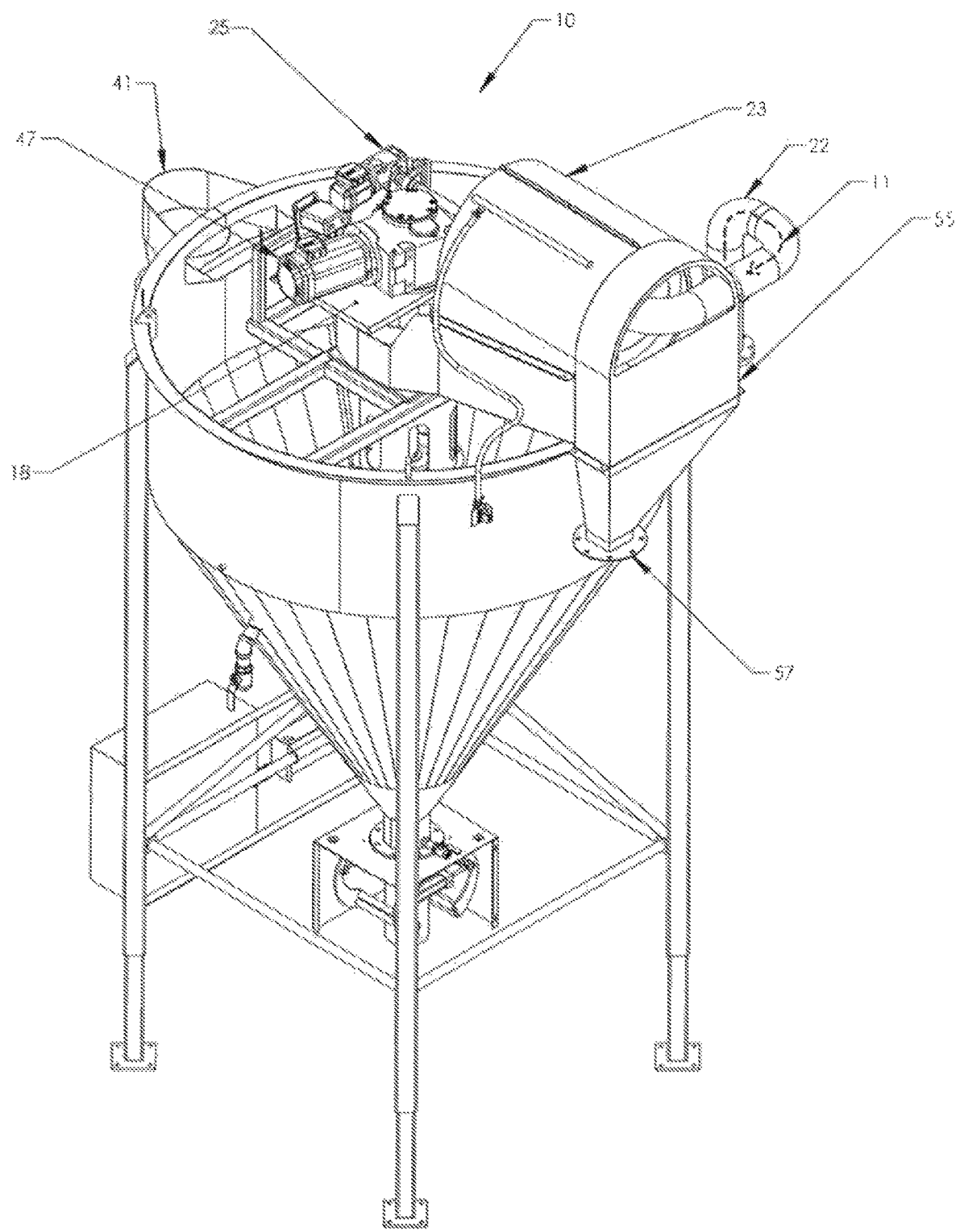
FIG. 3 is a perspective view of the extrusion system of FIG. 2, rotated 90 degrees.

FIG. 3 shows a perspective view of the extrusion system of FIG. 2, rotated 90 degrees. Motors 25 and 47 are shown mounted on the instrument platform 18. The inlet filter 23 may be equipped with an external cover 55, as shown, that is configured to deflect screened waste emerging from the rotary screener to a collection point 57.

Figure 4:
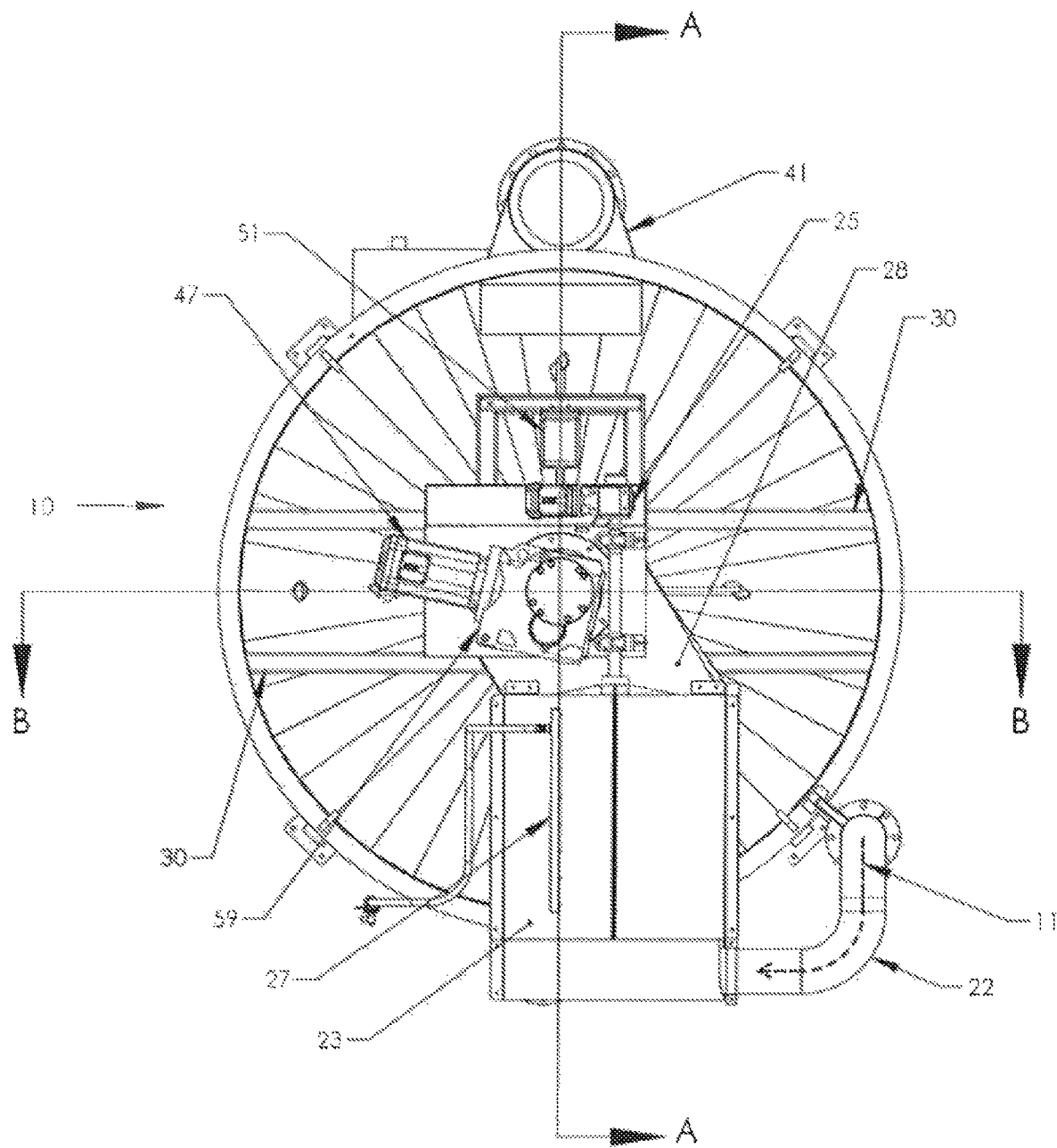
FIG. 4 is a top view of the extrusion system of FIG. 2.

FIG. 4 shows a top view of the extrusion system of FIG. 2. This view in particular illustrates the orientation of the drain pan 28, configured to channel the soiled water 11 from the outlet of the inlet filter 23 into diffuser beneath the instrument platform 18. Auger drive unit 59 is shown mounted on the instrument platform and mechanically coupled to the motor 47. The top of level sensor 51 is also shown along with other components previously described.

Figure 5:
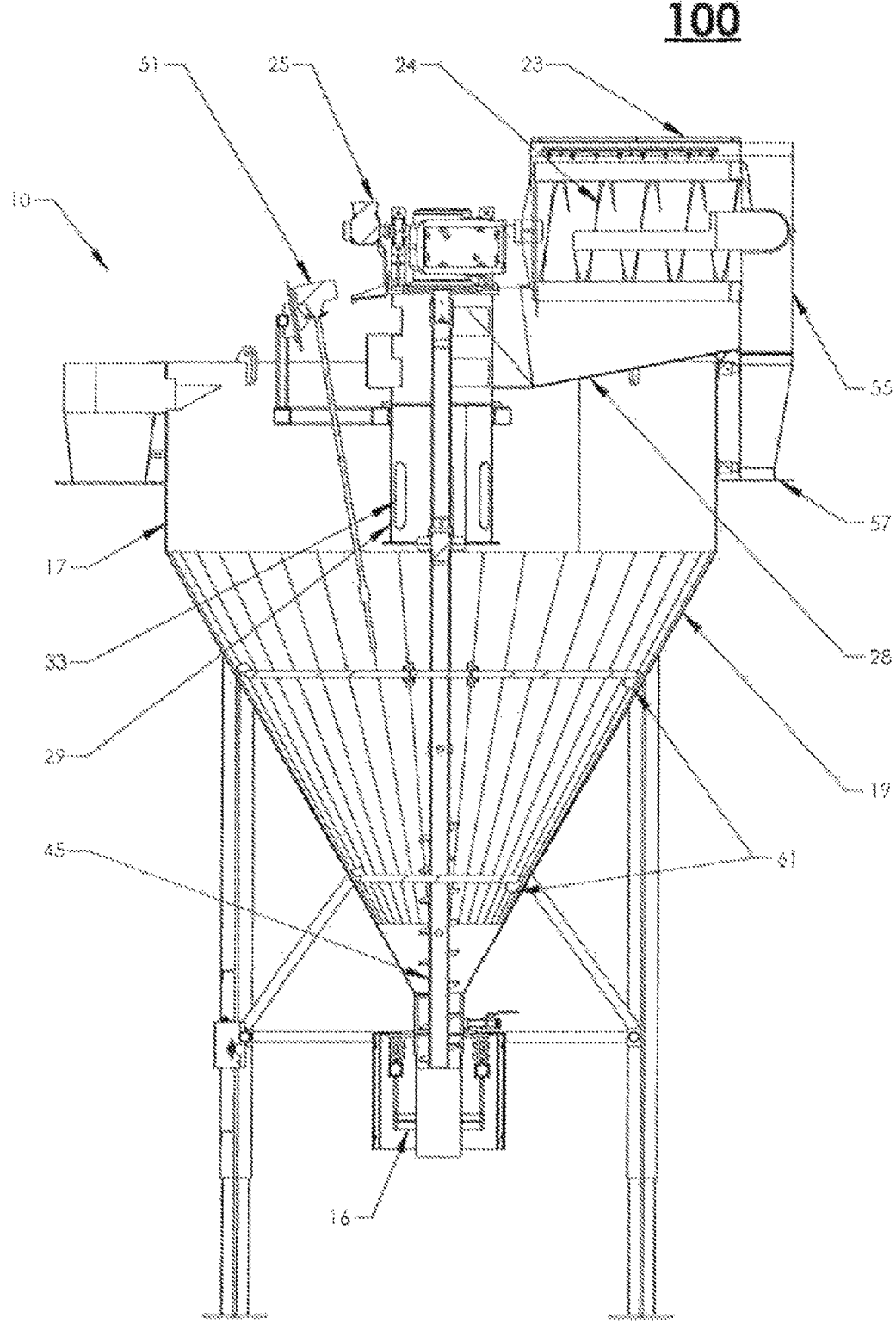
FIG. 5 is a cross sectional view of the extrusion system of FIG. 4 taken along section A-A.

FIG. 5 is a cross sectional view of the extrusion system of FIG. 4 taken along section A-A. The helical baffle 24 is shown disposed along the inner wall of the rotary screen of the inlet filter 23. A portion of an optional helical scraper 61 is shown installed inside the frusto-conical portion 19 of the settling tank 10 near the bottom of the tank. The helical scraper 61 provides a means for scraping soil concentration from an inside wall of the settling tank. Preferably, the helical scraper 61 is configured so that rotation thereof will cause contact over the entire surface area of the conical portion of the inner wall. In one embodiment, the helical scraper 61 is mechanically linked to the auger 45 so that it rotates when the auger rotates. In another embodiment, the helical scraper 61 is powered separately from the auger 45. Optionally, the helical scraper may be actuated during non-operational periodic maintenance of system 100, to assist in cleaning and obviate the need for manual labor.

Figure 6:
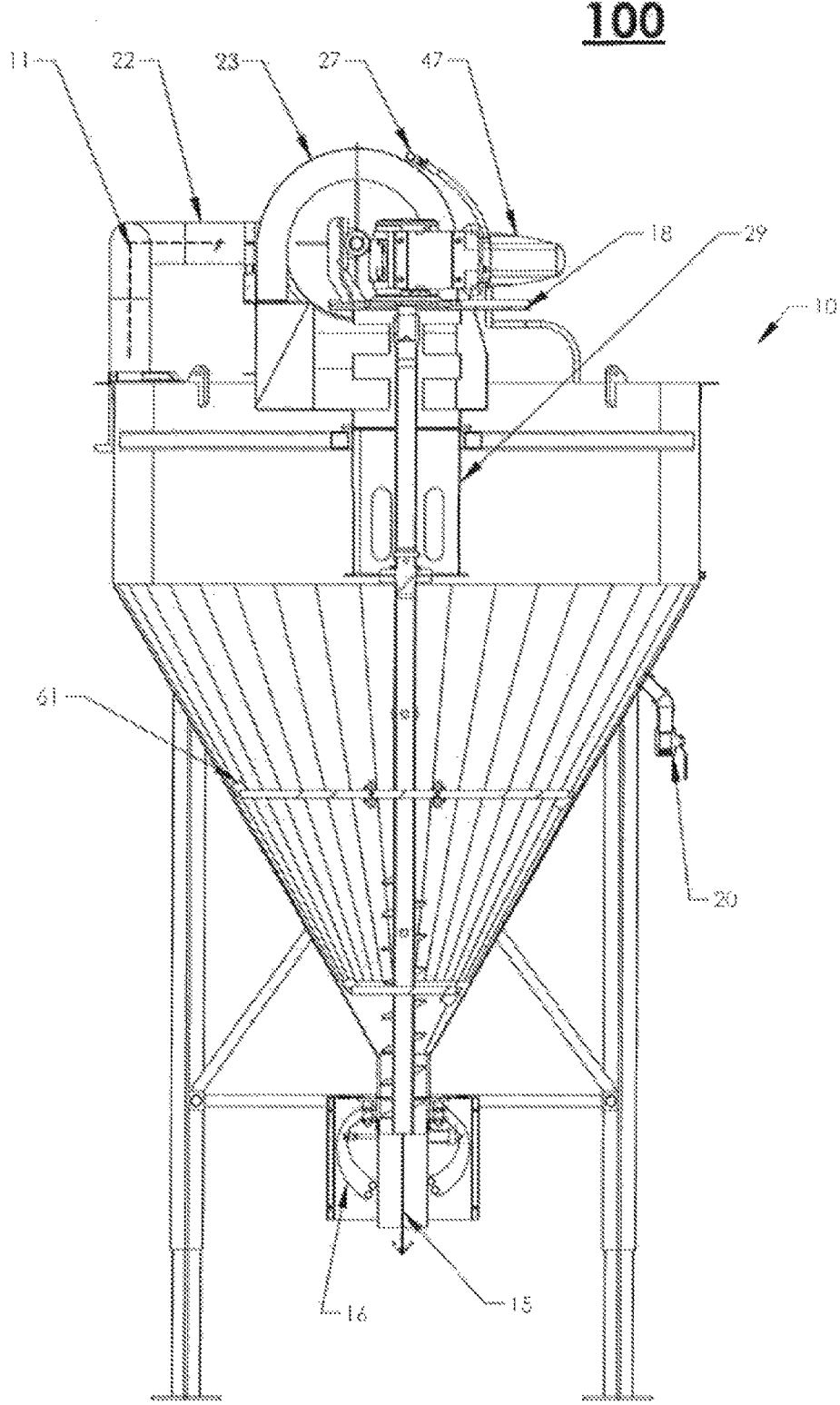
FIG. 6 is a cross sectional view of the extrusion system of FIG. 4 taken along section B-B.

FIG. 6 is a cross sectional view of the extrusion system of FIG. 5 taken along section B-B. This view shows another portion of the helical scraper 61, located about midway up the frusto-conical portion 19. The direction of discharge of concentrated soil 15 is indicated at the outlet of pinch valve 16.

Figure 7:
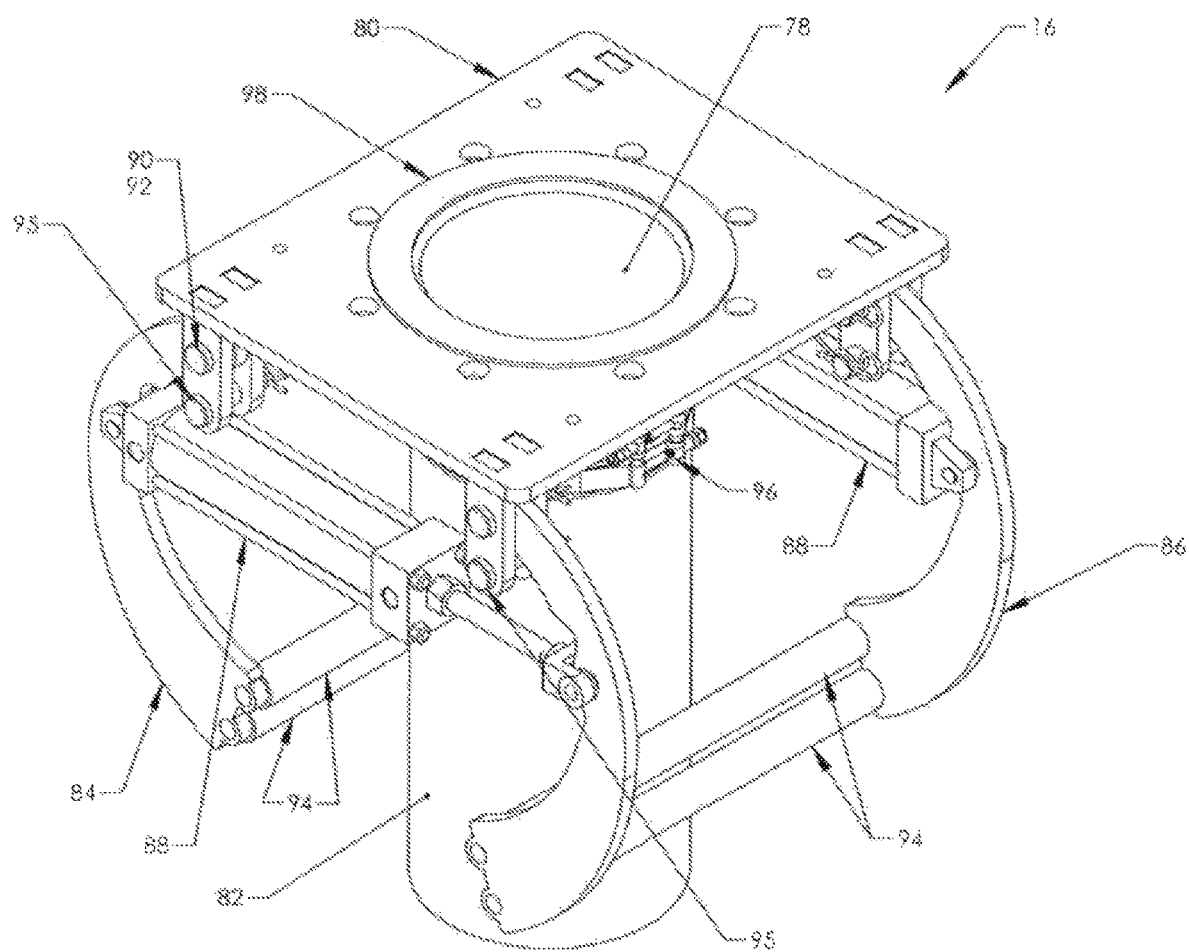
FIG. 7 is a perspective view of one embodiment of a pinch valve for use in extruding soil from a system according to the invention.

FIG. 7 illustrates one embodiment of a specially configured pinch valve 16 that may be installed in system 100 for extruding concentrated mud from the bottom of the settling tank. In this embodiment, the pinch valve 16 comprises a center pipe 78 affixed to a mounting plate 80. The mounting plate 80 provides a flange for coupling center pipe 78 to another pipe or flow channel such as the lower opening 14 of settling tank 10. A gasket 98 provides a leak-proof seal for the coupling. The center pipe 78 may be open at its top to receive a distal portion of the auger 45. At its lower end, the center pipe 78 may include a hose barb (not shown), either coupled thereto or machined onto its lower end, to receive a length of flexible conduit 82. The flexible conduit 82 may be formed from a synthetic rubber hose, and may be attached to the lower end of center pipe 78, for example, by means of one or more hose clamps 96. From there the flexible conduit 82 extends further downward between two opposing clamping arms 84 and 86, and also between electric or pneumatic linear actuators 88 as shown.

Each actuator 88 is coupled to the clamping arms 84 and 86 to allow for closure or release of the clamping arms by remote control. Each clamping arm 84, 86 is configured with a set of two or more parallel rods 94, preferably padded rods, that extend in a direction normal to the central axis of the flexible conduit 82. The length of each parallel rod 94 is preferably equal to or greater than the flattened diameter of the flexible conduit 82. A clamping arm mounting post extends downward from each corner of the mounting plate 80 to provide a means for rotatably coupling the clamping arms 84, 86 to the mounting plate. A clevis pin 90 and bronze bushing 92 link each clamping arm 84 or 86 to a clamping arm mounting post through an appropriately sized hole defined therethrough, and the clevis pin may be held in place by a cotter pin. In this manner, the clamping arms can pivot on the clevis pins in the bronze bushings until they hit a travel stop 95. In one embodiment, each travel stop 95 may be a pin that runs through a clamping arm mounting post and that is held by a cotter pin at a position below the clevis pin 90 to ensure interference with downward rotation of a clamping arm 84, 86.

Accordingly, the pinch valve 16 is configured so that in response to a closing actuation signal, the linear actuators 88 force the clamping arms 84, 86 to rotate downward about the clevis pins 90 until the rotation is arrested by the travel stops 95. This action closes the valve by compressing the flexible conduit 82 between opposing sets of parallel rods 94. Under the compressing force, opposing parallel rods 94 tend to interleave, or interlock, thereby pinching shut the flexible conduit 82 and arresting passage of concentrated soil 15. The pinch valve 16 is further configured so that in response to an opening actuation signal, the linear actuators 88 force the clamping arms 84, 86 to rotate open, thereby allowing concentrated soil 15 to be extruded through the flexible conduit 82. Advantageously, a pinch valve 16 according to the invention locates all of its moving parts outside of the flexible conduit 82, to prevent soil and other material passing through the conduit from interfering with valve actuation.

The operation of system 100 as described above with reference to FIGS. 1-7 circumscribes a method according to the invention for separating soil from water. Salient steps of the method include (i) receiving soiled water into a settling tank, (ii) diffusing the received soiled water into multiple transverse flows, (iii) allowing soil to settle at a bottom of the settling tank, (iv) sensing settled soil level above the bottom of the settling tank, and (v) extruding settled soil from the bottom of the settling tank responsive to sensing the settled soil level achieving a predetermined setpoint. Additional steps may be performed in more elaborate embodiments of the invention. These may include any combination of the following: helically filtering the soiled water prior to receiving the soiled water into the settling tank; scraping soil concentration from an inside wall of the settling tank; converting a singular vertical flow of soiled water into multiple transverse flows; directing the singular vertical flow against a baffle suspended or immersed within the settling tank; directing each of the multiple transverse flows through a port located above the baffle; sensing the settled soil level at a single location by means of a displacement sensor; actuating an auger in response to sensing a maximum or minimum soil level to force the settled soil through the bottom of the settling tank or arrest operation of the auger; and actuating a pinch valve or specialized pinch valve in response to sensing a maximum or minimum soil level to allow or arrest passage of the settled soil through the bottom of the settling tank.

Figure 8:
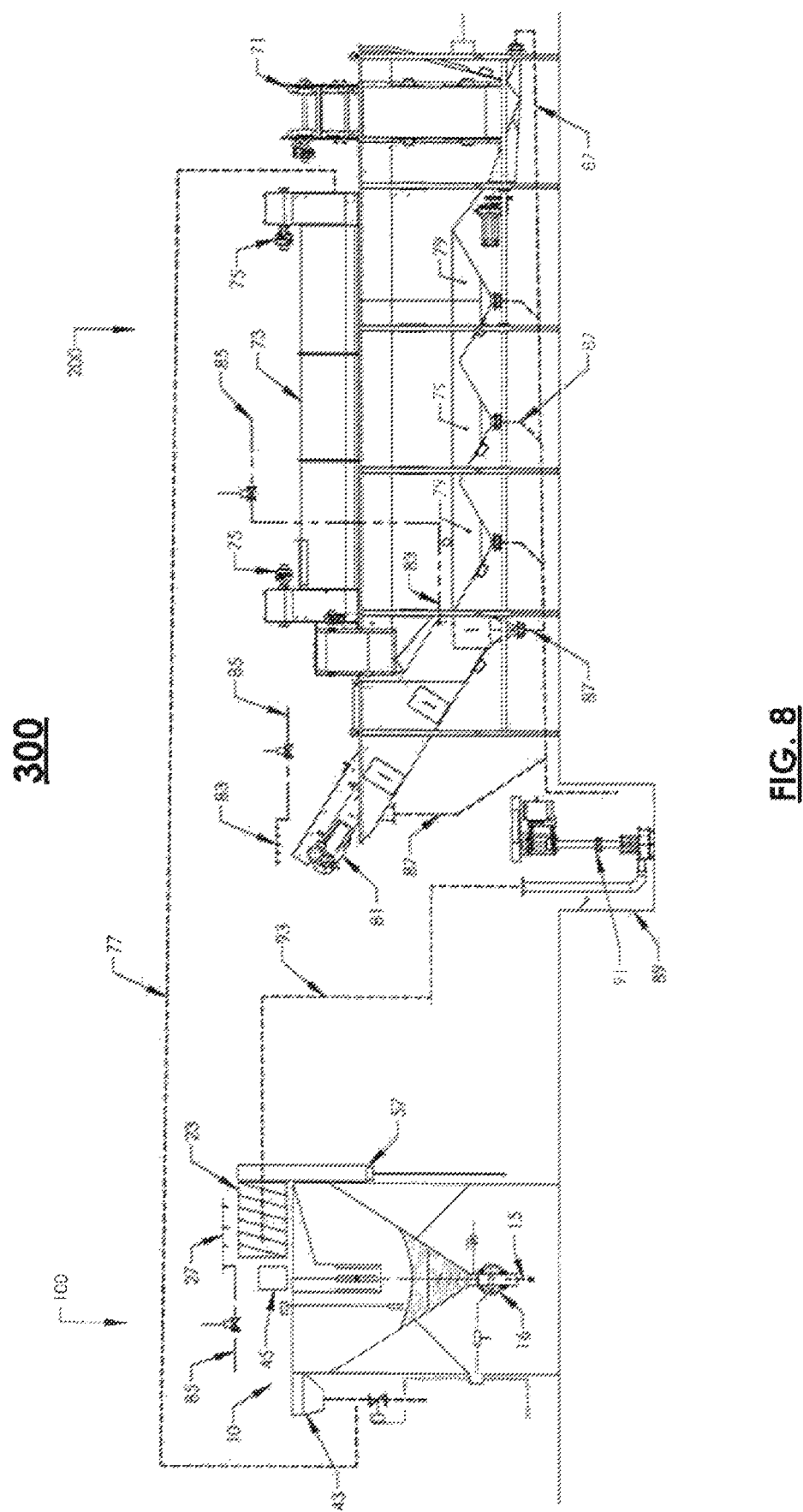
FIG. 8 is a diagrammatic side view of one embodiment of a system according to the present invention, shown on the left-hand side, for separating soil from a wash water byproduct of a crop washing system, shown on the right-hand side, and for recirculating clarified water to the crop washing system.

FIG. 8 shows a diagrammatic side view of an in situ vegetable processing system 300 to illustrate an exemplary practical use of the invention. System 300 consists of a system 100 according to the present invention in fluid communication with a typical crop washing system 200. System 100 (shown on the left-hand side) separates soil from a soiled water byproduct of system 200 (shown on the right-hand side), and recirculates clarified wash water for reuse in system 200.

At the right-hand side of system 200, harvested produce is delivered to a washing drum 73 by a series of vertical and horizontal conveyors (not shown). The produce may be a tuberous crop such as potatoes that are typically coated with dirt and accompanied by rocks and other unwanted debris from the field. In this condition the produce is deposited into the washing drum 73. The interior walls of washing drum 73 are equipped with helical baffles that direct the produce through the drum as the drum rotates under the motive force of one or more motors 75. Clarified wash water from recirculation line 77 is pumped or gravity fed into the washing drum 73 to immerse the produce as it rotates forward. The water flow and mechanical action of the washing drum wash away a substantial amount of the dirt, and the dirty wash water is collected below the drum into one or more reservoirs 79. Additional filtration stages may be provided, for example, to trap rocks or floating debris, which are eventually removed from system 200 via a vertical conveyor 71. Produce exiting the washing drum is carried on conveyor 81 and subjected to additional cleaning from one or more spray bars 83 that are supplied by a pressurized source of fresh water 85. The cleaned produce may then be conveyed for further processing, or transported to a packaging or storage facility.

Water from the spray bars 83 and from the reservoirs 79 is routed through drain lines 87 and collected into a sump 89. The soiled water 11 in the sump is a low-clarity mixture of soil, vegetable matter, and other debris. Further processing of the soiled water 11 is required to remove the debris and improve the clarity so that it may be recirculated to the washing drum or routed away as wastewater. The invention of system 100 provides a means for clarifying the soiled water.

System 100 receives the soiled water 11 from the sump 89, for example, by means of a sump pump 91, which pumps the soiled water 11 through a conduit 93 to the system inlet. System 100 then processes the soiled water 11 as described above. Clarified water at drain 43 is then routed through recirculation line 77 for use as wash water by system 200.

Plate Pack Particulate Filters

Settling tanks 100 configured in accordance with the present invention may be further equipped with any of a variety of particulate filters in the form of a plate pack. In general, the plate pack is installed at an intermediate location within the settling tank. The plate pack directs soiled or particulated water received from the diffuser downward through a wide channel defined through the center of the plate pack. Particulated water exits the channel at low velocity and mixes with water that has accumulated in the tank. While some of the particulate entrained in flow settles toward the bottom of the tank, other particles, especially the smaller and lighter particles, remain entrained in the flow as it is forced slowly upward through the plate pack. The plate pack directs the upward flow through a plurality of narrow channels that are typically formed in the spaces between closely stacked parallel plates. At low velocity, the flow is laminar, such that boundary layers of zero or near-zero velocity occur along the surfaces of the plates. Particles that are entrained in the flow through these narrow channels contact the boundary layer and tend to become trapped on the plate surface. According to the invention, the plate pack is configured so that the angle of the plate surface with respect to horizontal exceeds the angle of repose for a particle or class of particles which are to be separated from water that rises to the top of the tank. Those particles, trapped along the boundary layer, will then gradually slip downward or sink along the plate surface under force of gravity, and eventually settle at the bottom of the tank. The disclosure that follows presents several exemplary embodiments of plate pack configurations for use in an extrusion system of the present invention.

Figure 9:
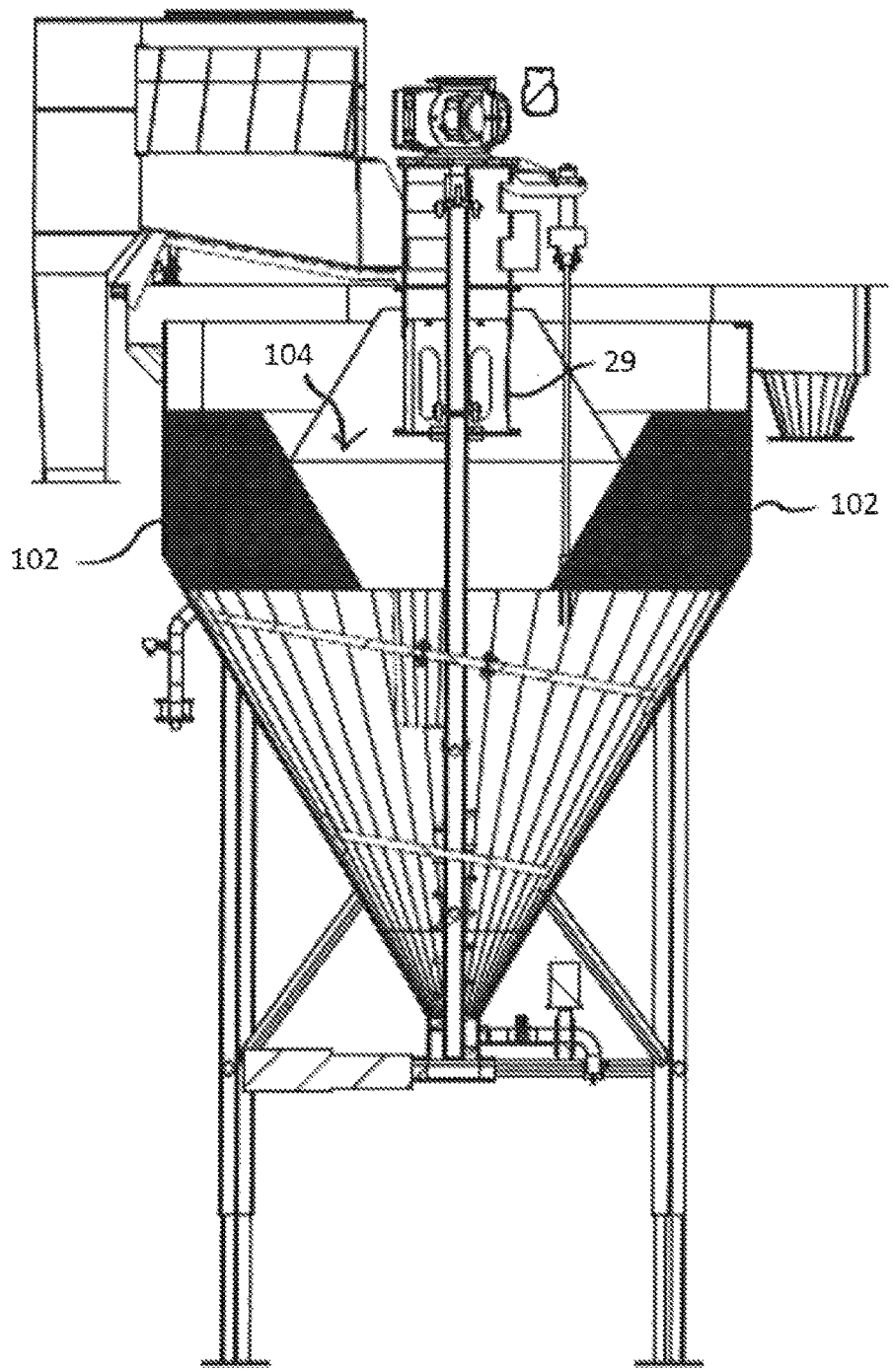
FIG. 9 is a cross sectional view of an extrusion system as shown in of FIG. 4 further equipped with a plate pack particulate filter according to the invention, with the view taken along section B-B of FIG. 4.
Figure 10:
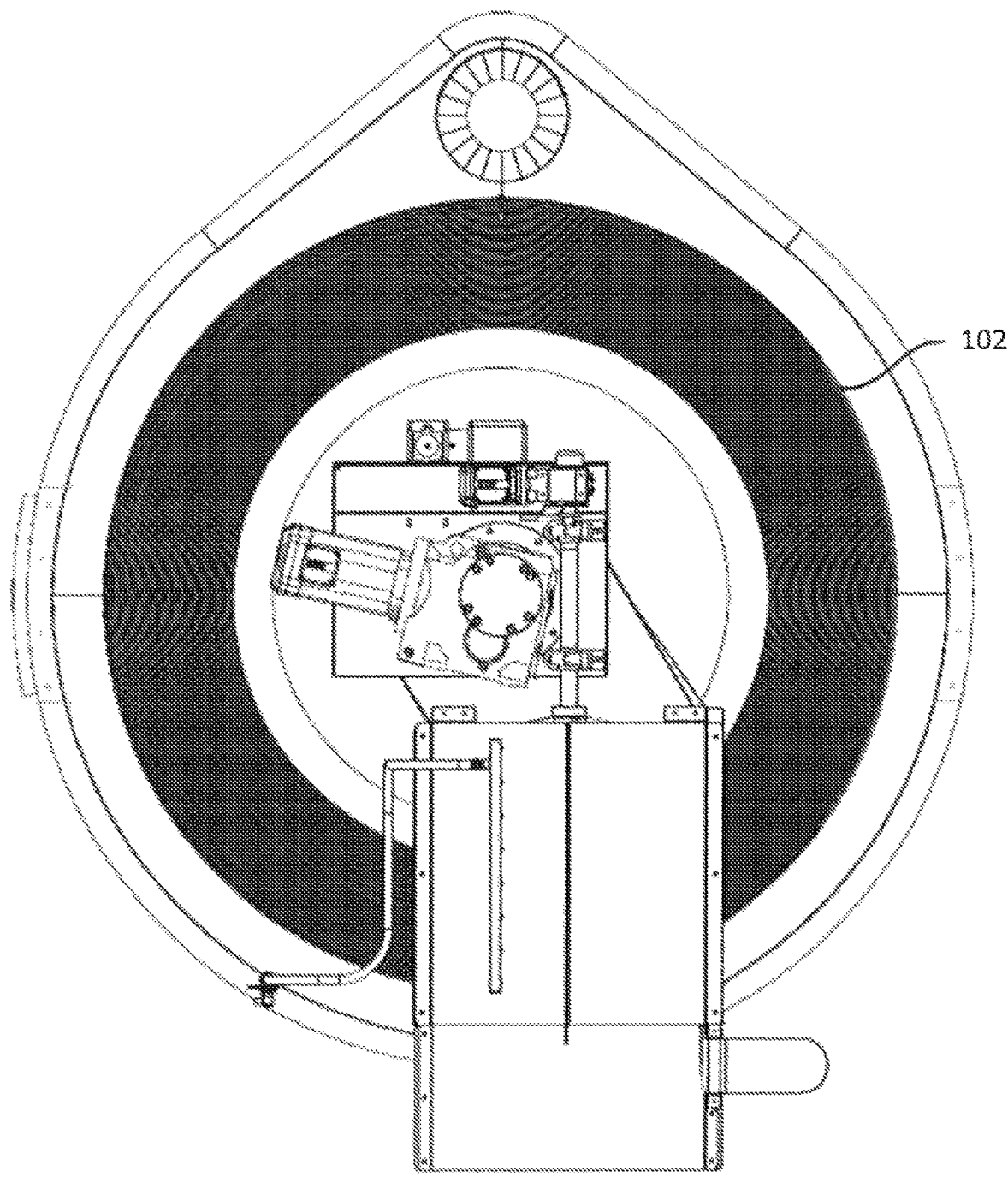
FIG. 10 is a top view of the extrusion system of FIG. 9.

FIG. 9 shows a cross sectional view of an extrusion system 400. System 400 is similar in form and function to system 300, and is further equipped with a plate pack particulate filter (hereafter "plate pack") 102 according to the invention. In FIG. 9, the cross section B'-B' is taken along the same perspective of section B-B of FIG. 4. The plate pack 102 is fixed within the settling tank and located at an elevation beneath the diffuser 29. The plate pack 102 is generally cylindrical in form. In one embodiment, the plate pack 102 has a height of about 30 in. and an outer diameter of about 8 ft. Plate pack 102 defines a channel 104 that extends vertically through the center of the plate pack. At its narrowest width, the inside diameter of channel 104 is about 18 in., but at least wide enough to accommodate the diffuser 29. In one embodiment, channel 104 may be conical, and its inner diameter at its maximum may be about twice that of its minimum inner diameter. In one example, the inner diameter of channel 104 may be vary from about 2 ft. to about 4 ft. The diffuser 29 provides a means for directing particulated water that enters the settling tank to an intermediate elevation below the top of the settling tank. In operation, channel 104 receives particulated water from multiple transverse flows exiting diffuser 29, and further directs the flows downward through the plate pack. In preferred implementations, the channel 104 may be generally cylindrical or conical, and concentrically oriented with respect to the plate pack 102. FIG. 10 shows a top view of the extrusion system 400. From this perspective the plate pack 102 appears ring-shaped. The general form, appearance, and location of plate pack 102 as shown in FIGS. 9 and 10 represent those of the plate pack embodiments that are further described with reference to FIGS. 11 to 30. In all embodiments herein, the plate pack and its constituent parts are preferably formed from stainless steel, e.g. 304 SS, whether machined, forged, welded, or connected by means of conventional fasteners. Typical thickness of each plate within the plate pack may be on the order of about 10 ga. to 24 ga.

Figure 11:
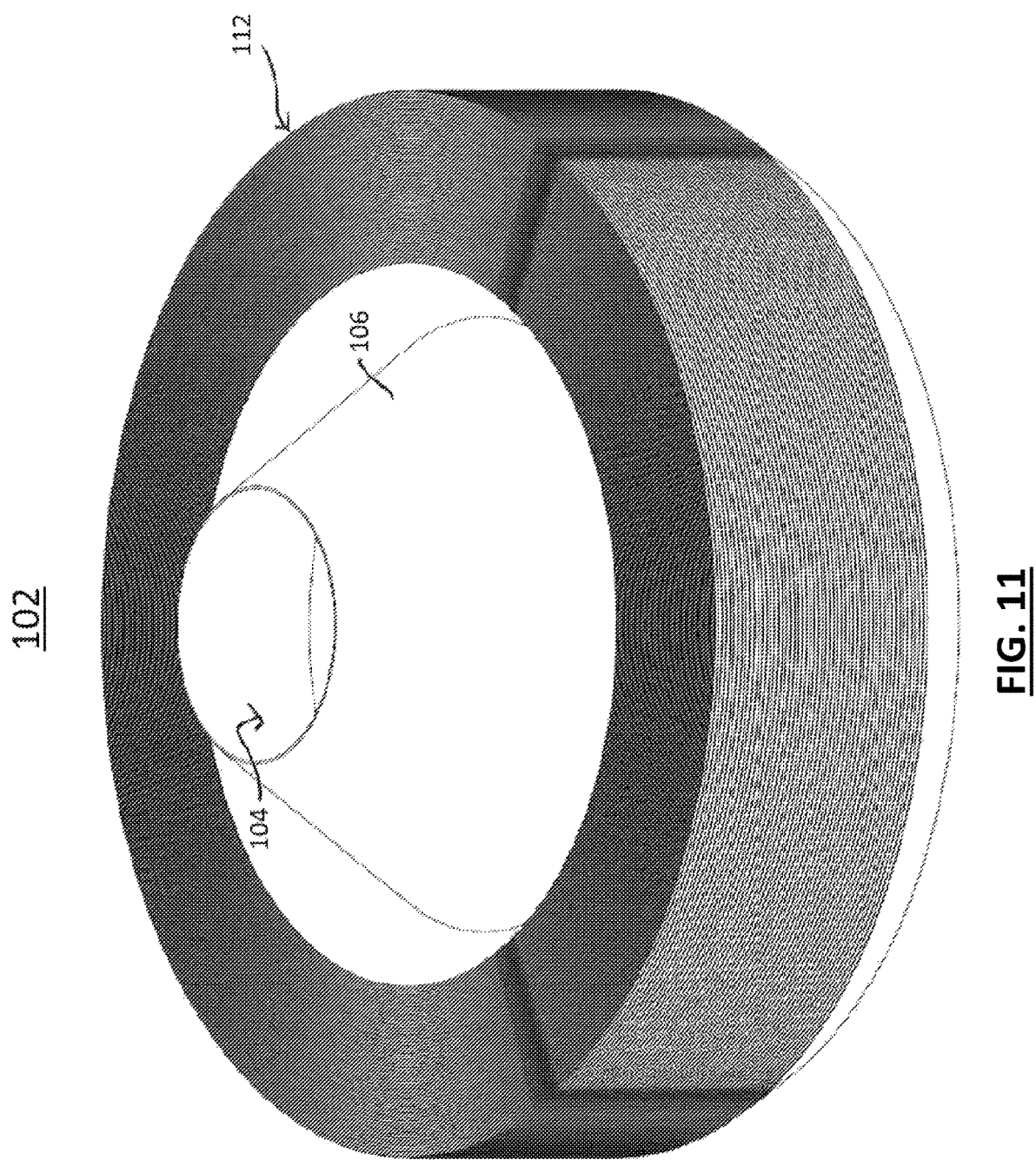
FIG. 11 is a perspective view of one embodiment according to the invention of a plate pack particulate filter consisting of a cylindrical array of conical coaxial parallel plates.
Figure 12:
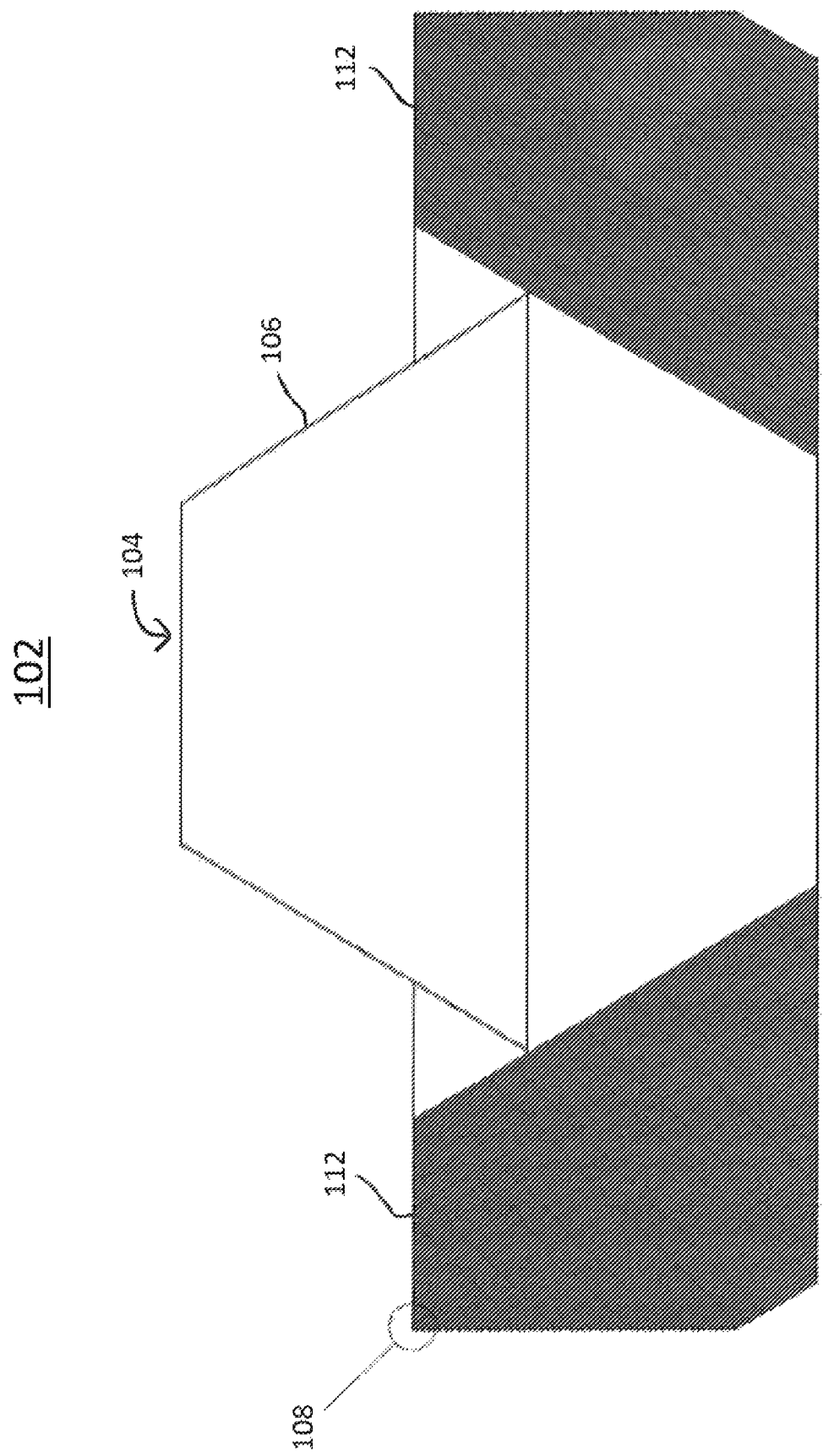
FIG. 12 is a cross sectional view of the plate pack of FIG. 11, taken along a bisecting diameter of the plate pack.
Figure 13:
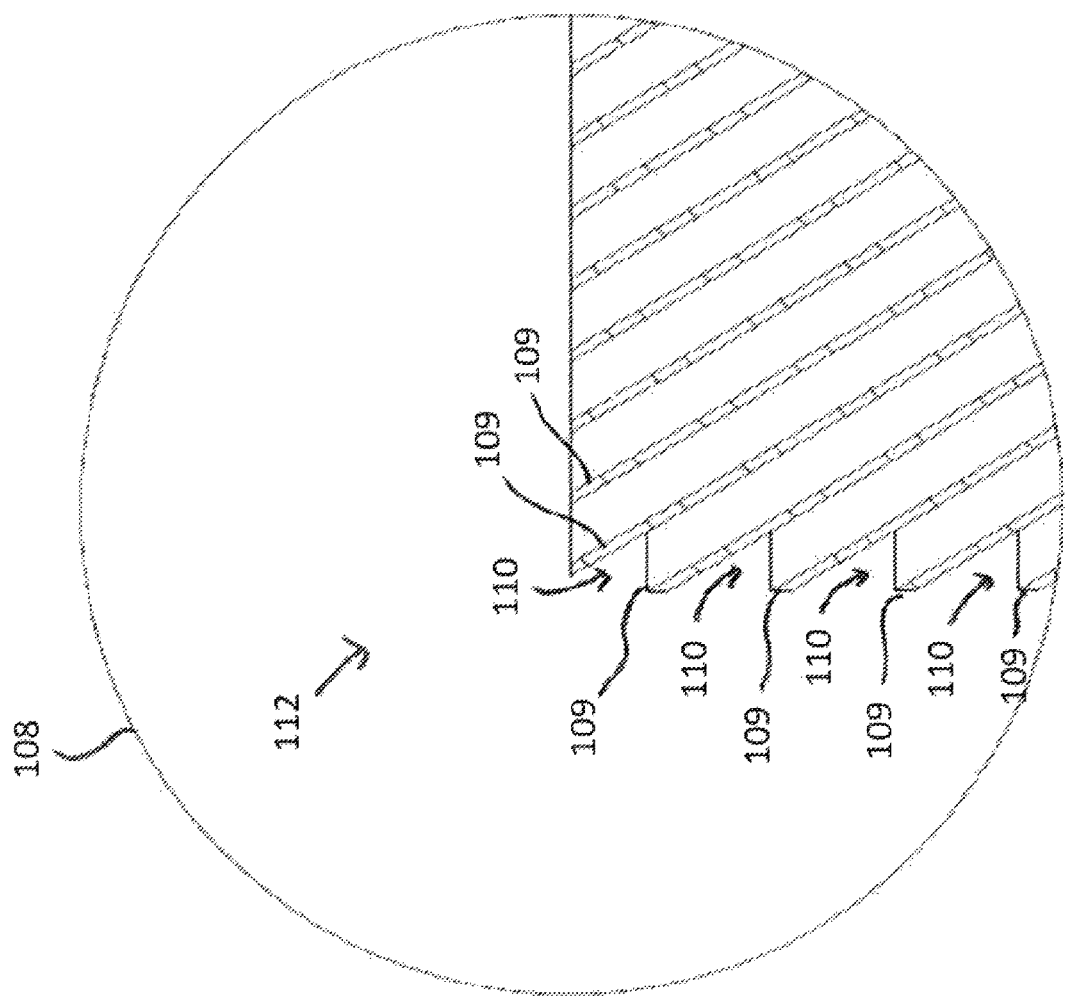
FIG. 13 is a magnified view of an upper corner of the cross sectional view of the plate pack of FIG. 10.

FIG. 11 shows a perspective view of an embodiment according to the invention of a plate pack 102 consisting of a cylindrical array 112 of conical coaxial parallel plates. The cylindrical array 112 surrounds a channel 104 defined through the center of the array 112. Channel 104 is formed through a truncated cone 106 that is attached to and aligned concentrically with the cylindrical array. FIG. 12 shows a cross sectional view of the cylindrical array 112, taken along a bisecting diameter of the plate pack. For purposes of illustration, a portion 108 of the array in the upper left corner of this figure is encircled for magnification. FIG. 13 shows the magnified view of portion 108. The magnified view shows, in cross section, the upper left corner of the array of conical coaxial parallel plates 109. Between each adjacent pair of conical coaxial parallel plates 109, a channel 110 is formed to allow passage of particulated water as it rises through the plate pack. The array of conical coaxial parallel plates 109 provides a filter for trapping and sinking particulates having an angle of repose less than the angle of the plate surface with respect to horizontal. In one embodiment, that angle is set between about 50 degrees and about 70 degrees.

Figure 14:
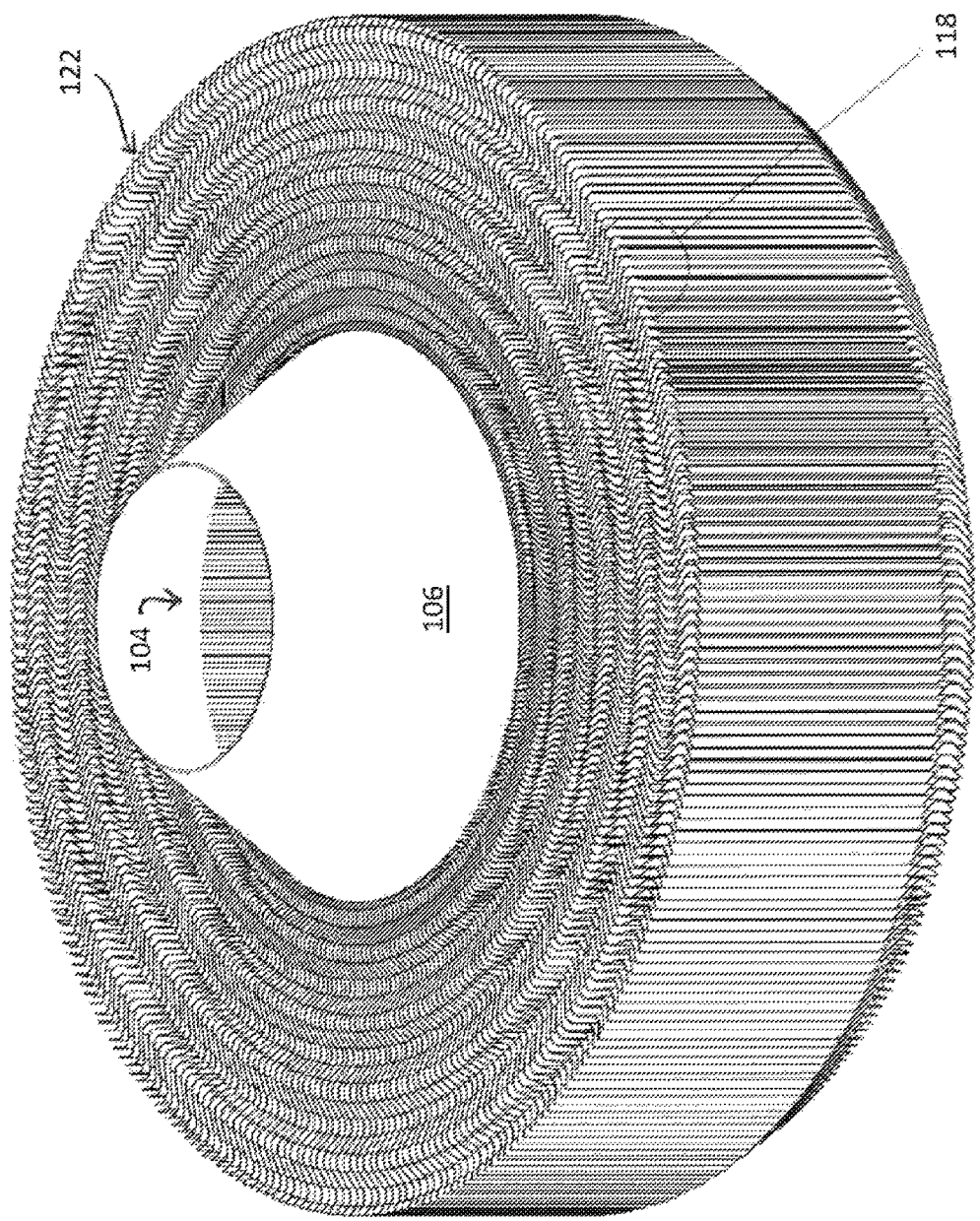
FIG. 14 is a perspective view of one embodiment according to the invention of a plate pack particulate filter consisting of a cylindrical array of radially aligned undulating vertical plates.
Figure 15:
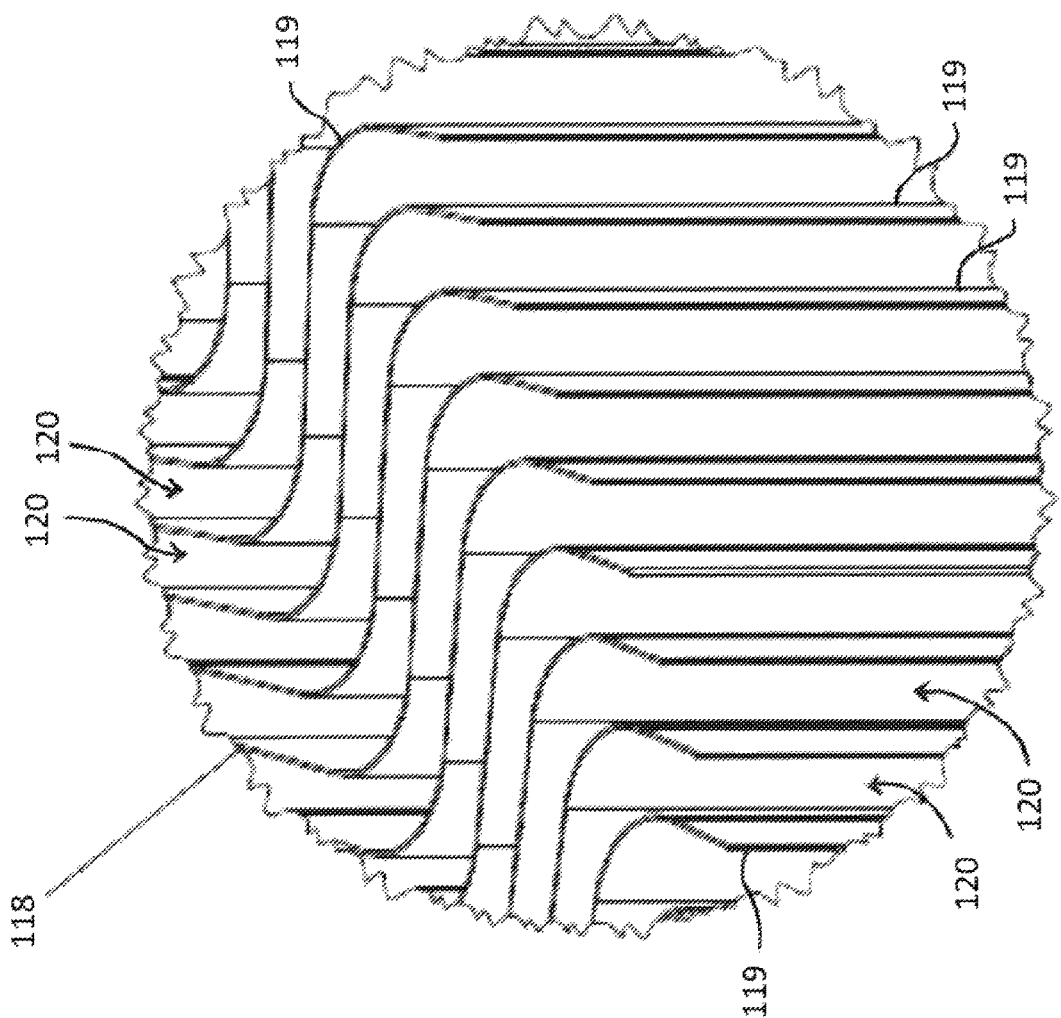
FIG. 15 is a magnified perspective view of an upper corner of the plate pack of FIG. 14.

FIG. 14 is a perspective view of an embodiment according to the invention of a plate pack 102 consisting of a cylindrical array 122 of radially aligned undulating vertical plates. As in the previous embodiment, the cylindrical array 122 surrounds a channel 104 defined through the center of the array 122 and formed through a truncated cone 106 that is attached to and aligned concentrically with the cylindrical array. The undulation of the vertical plates may occur radially along each plate or along a top edge of each plate; or both radially and along the top edge, as shown. Radial undulation means that the side surfaces of each plate are sinusoidal, rather than planar, as they extend from an innermost radius to the outermost radius. Undulation along the top edge of each plate means that the height of each plate varies according to a generally sinusoidal curve along the top edge. For purposes of illustration, a portion 118 of an upper corner of the array is encircled in this figure for magnification. FIG. 15 shows the magnified perspective view of portion 118. The magnified view shows the upper corner of the array of radially aligned undulating vertical plates 119. Between each adjacent pair of radially aligned undulating vertical plates 119, a channel 120 is formed to allow passage of particulated water as it rises through the plate pack. The array of radially aligned undulating vertical plates 119 provides a filter for trapping and sinking a wide range of particulates, given the 90-degree angle of each plate surface with respect to horizontal. In one embodiment, each channel 120 defines a gap between an adjacent pair of plates 119 that varies from about 6.0 mil to about 40 mil along the entire radius of the adjacent plates. In another embodiment, the maximum channel gap at the perimeter of array 122 can be as much as 1.5 in.

Figure 16:
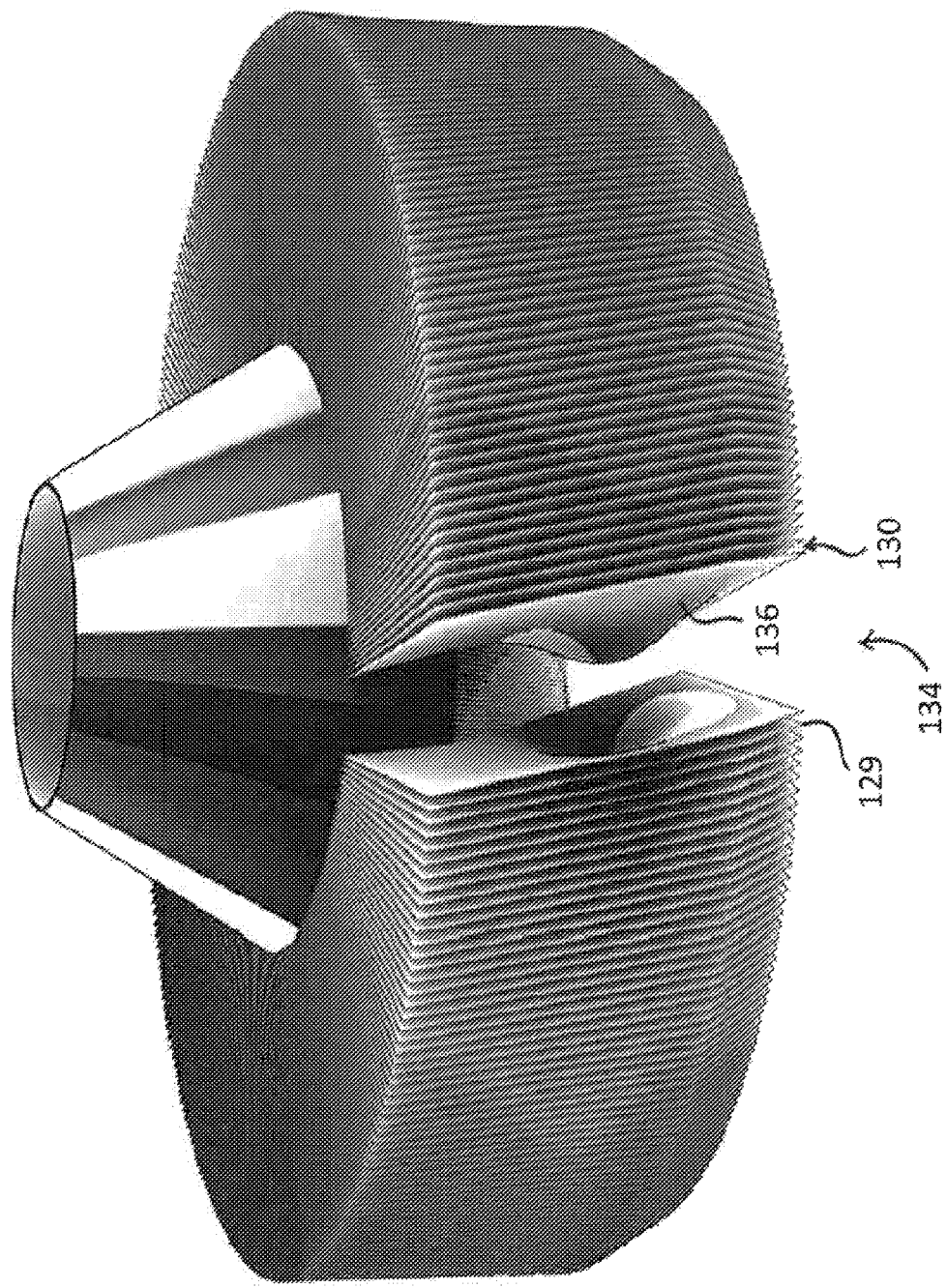
FIG. 16 is a partially cutaway perspective view of one embodiment according to the invention of a plate pack particulate filter consisting of a cylindrical array of radially aligned parabolically curved vertical plates.

FIG. 16 shows a partially cutaway perspective view of an embodiment according to the invention of a plate pack 102 consisting of a cylindrical array 132 of radially aligned parabolically curved vertical plates 129. At the cutaway portion 134, several of the vertical plates 129 have been removed to illustrate the parabolically curved surface 136. Each of the plates is identically shaped and includes the parabolically curved surface 136 that bulges outward from an interior area of each plate. In one embodiment, the parabolic bulge is substantially centered on the side surface of each plate 129. Each plate 129 in the array 132 extends radially from the conical channel and each is substantially equally spaced from adjacent plates to form a narrow channel 130 between any two adjacent plates. Each channel 130 allows passage of particulated water as it rises through the plate pack 102. The array of radially aligned parabolically curved vertical plates 129 provides a filter for trapping and sinking a wide range of particulates, as the angle of each plate surface with respect to horizontal varies about the parabolic bulge. In one embodiment, the plate surface angle varies between about +/−75 degrees and +/−85 degrees.

Figure 17:
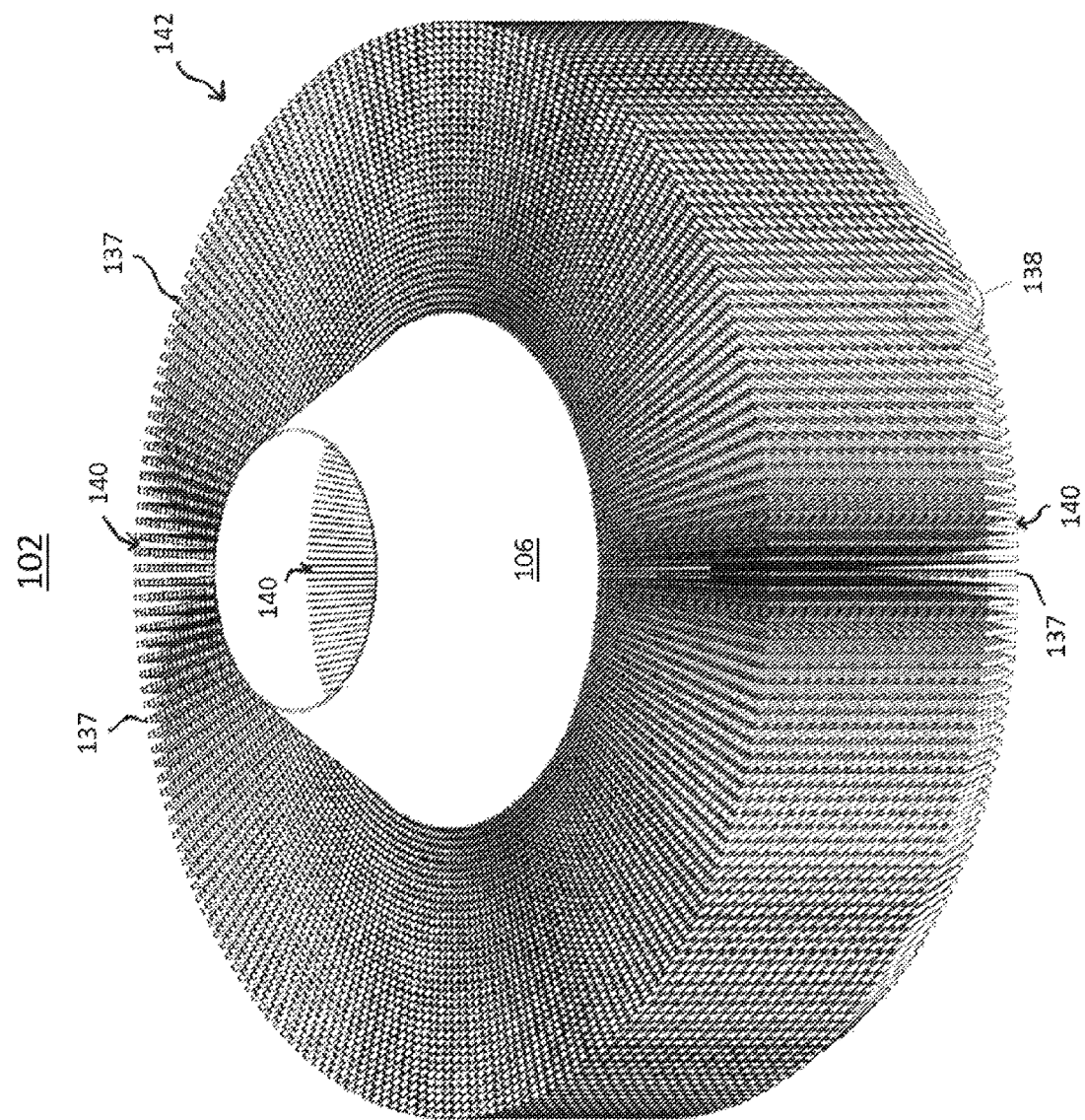
FIG. 17 is a perspective view of one embodiment according to the invention of a plate pack particulate filter consisting of a cylindrical array of radially aligned slanted capillary tube stacks.
Figure 18:
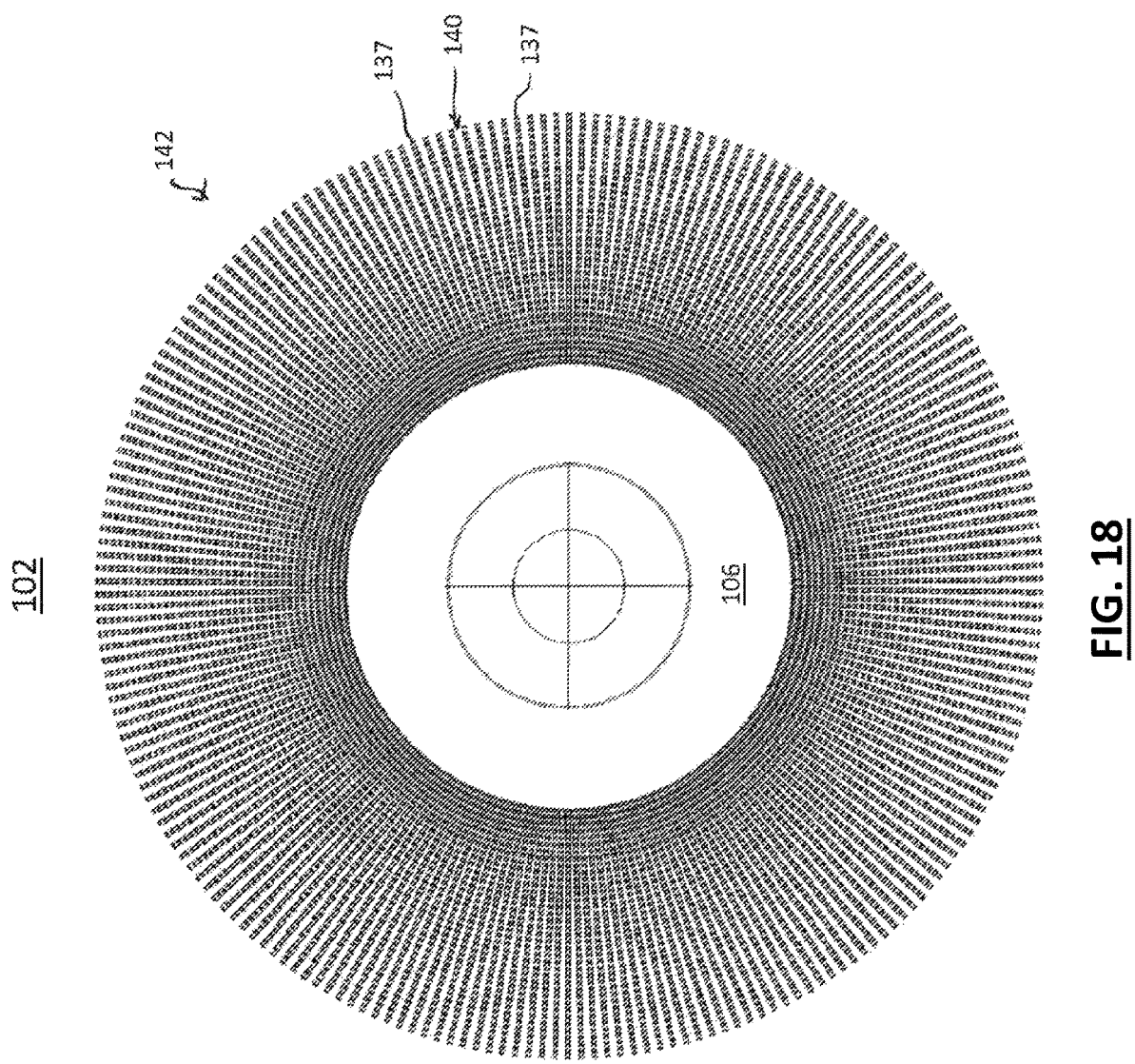
FIG. 18 is a top view of the plate pack of FIG. 17.
Figure 19:
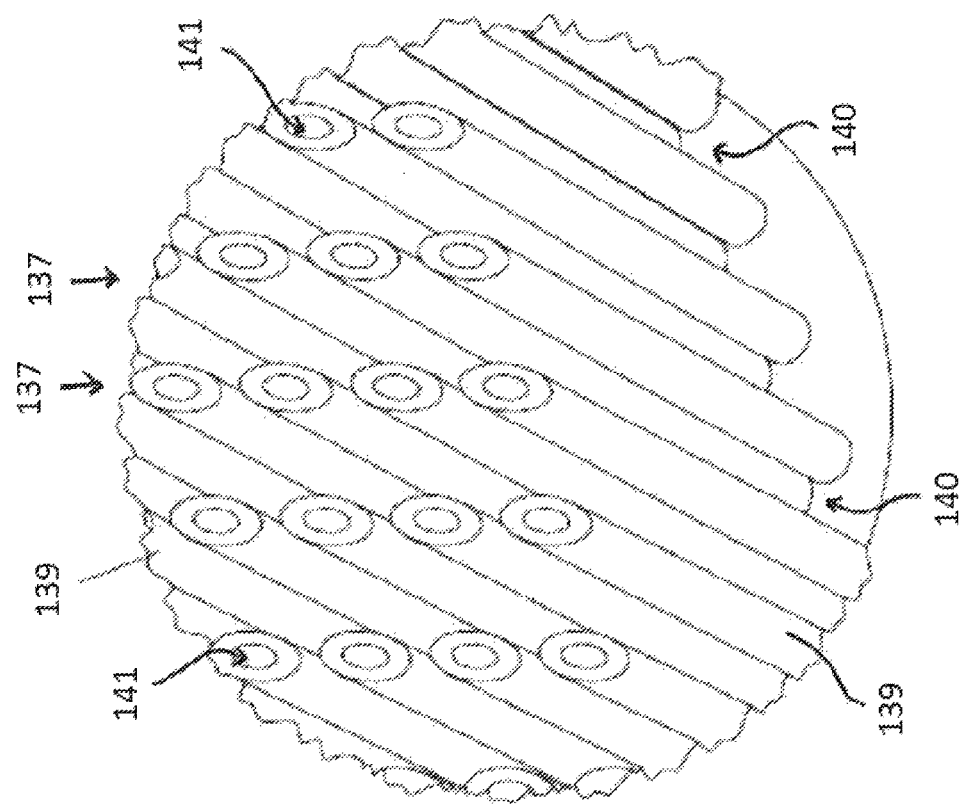
FIG. 19 is a magnified perspective view of a lower corner of the plate pack of FIG. 17.

FIG. 17 shows a perspective view of an embodiment according to the invention of a plate pack 102 consisting of a cylindrical array 142 of radially aligned slanted capillary tube stacks 137. FIG. 18 shows a top view of the plate pack 102 and FIG. 18A shows a magnified view of a portion of the top view. The top view shows gaps 140 between adjacent stacks 137 of capillary tubes 139. Gaps 140, however, are shown only to illustrate the structure and orientation of the slanted capillary tube stacks. In a finished cylindrical array 142, gaps 140 are blocked, e.g. by an upper or lower plate, so that they do not pass fluid. Cylindrical array 142 is configured so that particulated water can pass through the array only through the capillary tubes 139. For purposes of illustration, a portion 138 of a lower outer edge of the array 142 is encircled in FIG. 17 for further magnification. FIG. 19 shows the magnified perspective view of portion 118. The magnified view shows the general arrangement of slanted capillary tube stacks 137. Around the circumference of the array 142, each stack 137 is separated from adjacent stacks 137 in regular, radial alignment by a gap 140. Each stack 137 consists of multiple capillary tubes 139, one atop another, each slanted at a similar angle. Each stack extends radially outward from the central channel defined through cone 106 to the perimeter of the cylindrical array 142. A tubular channel 141 extends centrally through each capillary tube 139. The tubular channels 141 allow passage of particulated water as it rises through the plate pack. The array 142 of radially aligned slanted capillary tube stacks 137 provides a filter for trapping and sinking particulates having an angle of repose less than the slant angle of the capillary tubes with respect to horizontal. In one embodiment, that angle is set between about 50 degrees and about 70 degrees.

Figure 20:
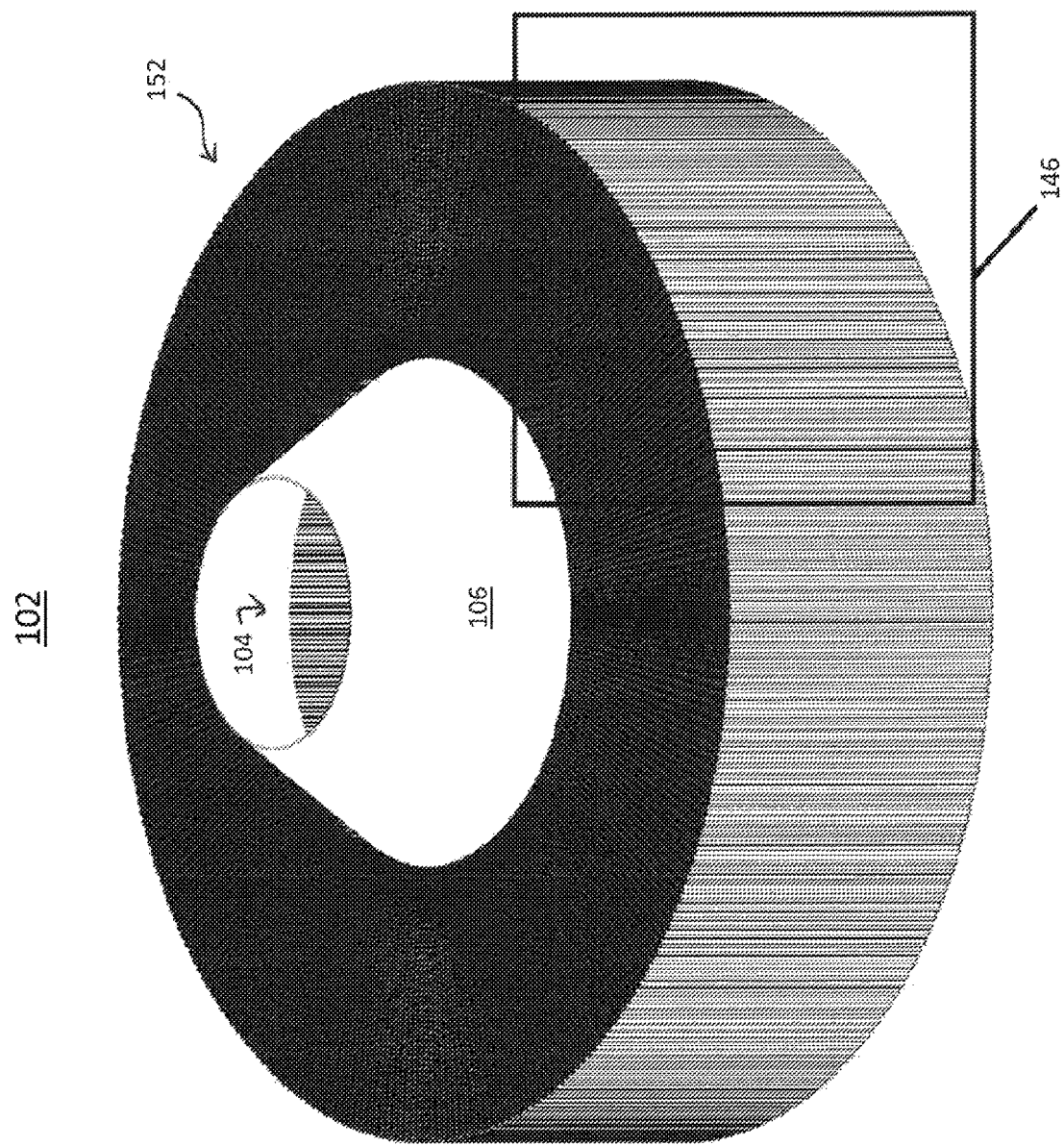
FIG. 20 is a perspective view of one embodiment according to the invention of a plate pack particulate filter consisting of a cylindrical array of concentric corrugated vertical plates.
Figure 21:
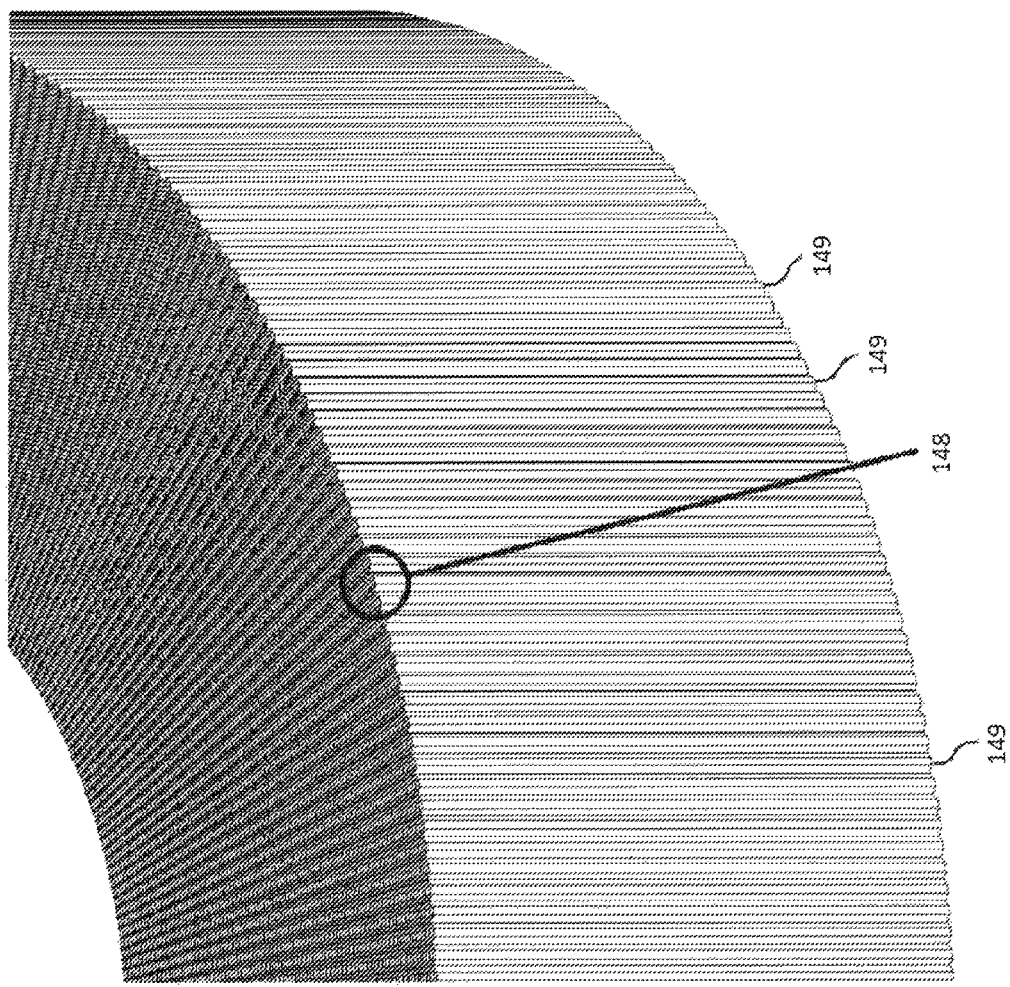
FIG. 21 is a magnified perspective view of an outer portion of the plate pack of FIG. 20.
Figure 22:
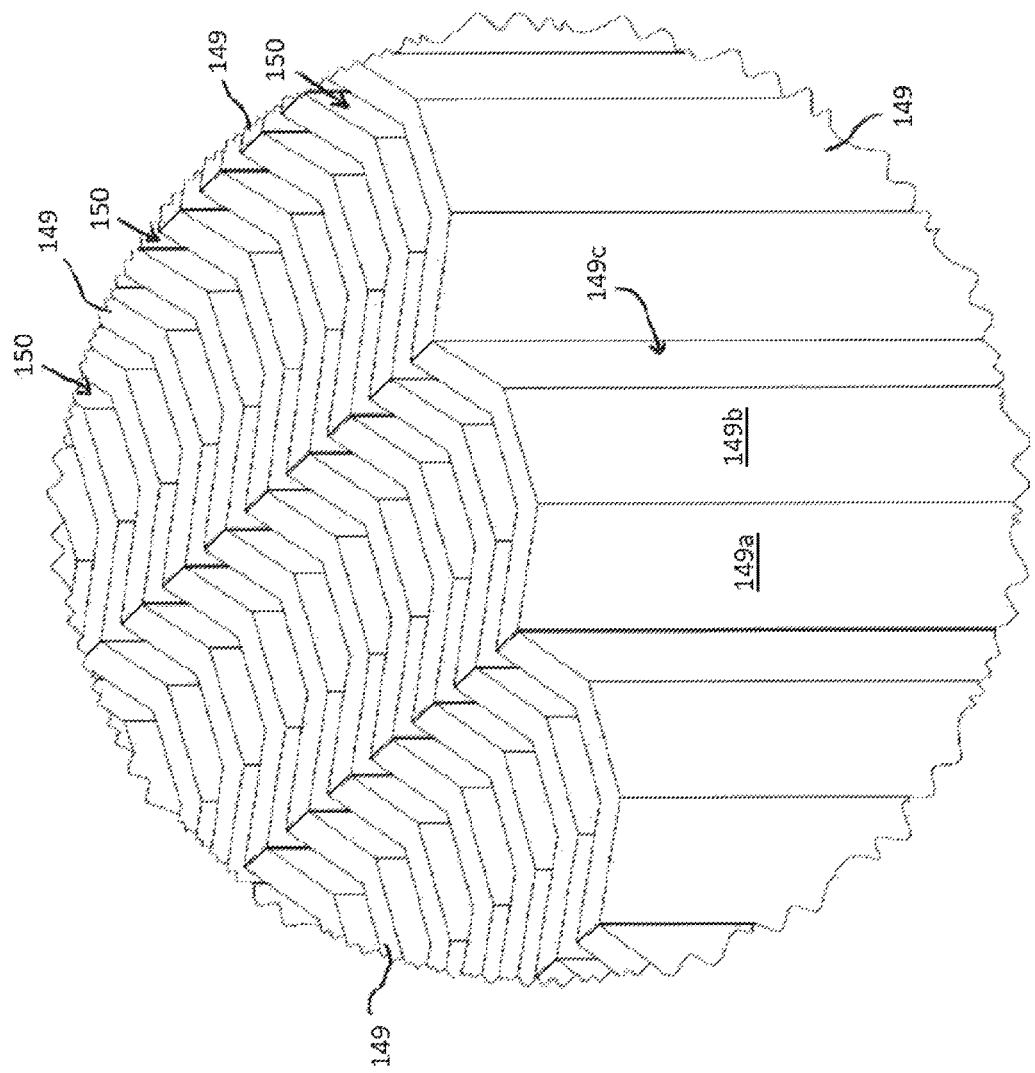
FIG. 22 is a further magnified perspective view of an upper corner of the magnified plate pack portion shown in FIG. 21.

FIG. 20 shows a perspective view of an embodiment according to the invention of a plate pack 102 consisting of a cylindrical array 152 of concentric corrugated vertical plates. The configuration of the array 152 is better illustrated by observing magnified views of an outer portion 146 of plate pack 102, as indicated in FIG. 20. FIG. 21 shows a first magnified perspective view of the outer portion 146, where an encircled portion 148 of an upper corner of the plate pack 102 is indicated for further magnification. FIG. 22 shows the further magnified perspective view of the encircled portion 148. Here, additional detail for the individual concentric corrugated vertical plates 149 can be observed. Each corrugated plate 149 may be formed from a stainless steel sheet by bending the sheet at regular intervals in a desired pattern of planar segments, then joining the ends of the plate (e.g. by welding) into a generally cylindrical form. For example, the outermost vertical plate 149 may be formed as a repeated pattern of three planar segments 149a, 149b, 149c. In one embodiment, each of the planar segments has an identical width. In another embodiment, one or more of the planar segments may have differing widths. In another embodiment, planar segment width may be between about 0.5 in. and 2.0 inches. Plate thickness may be on the order of about 10 ga. to 24 ga. In a preferred embodiment, the cylindrical array 152 is constructed by assembling concentric corrugated cylindrical plates of successively diminishing diameter so that the width of planar segments for each cylindrical plate diminishes slightly according to radial location of the plate. This arrangement provides an array of substantially parallel planar segments along any radial line and maintains a substantially consistent channel width 150 between adjacent corrugated plates. In one example, the width of each channel 150 is between about 6.0 mil and 40 mil. The array 152 of concentric corrugated vertical plates 149 provides a filter for trapping and sinking a wide range of particulates, given the 90-degree angle of each plate surface with respect to horizontal.

Figure 23:
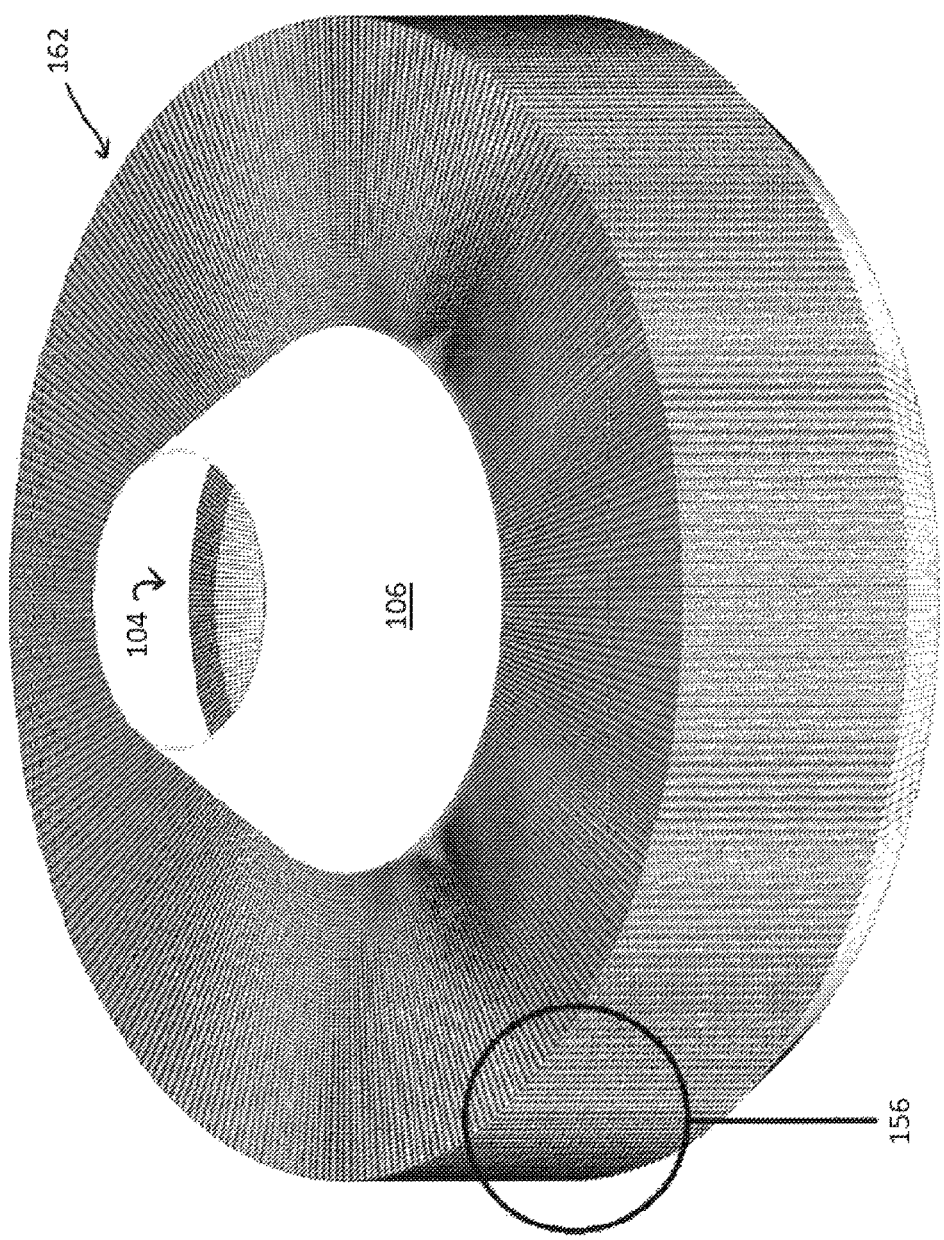
FIG. 23 is a perspective view of one embodiment according to the invention of a plate pack particulate filter consisting of a cylindrical array of conical coaxial corrugated plates.
Figure 24:
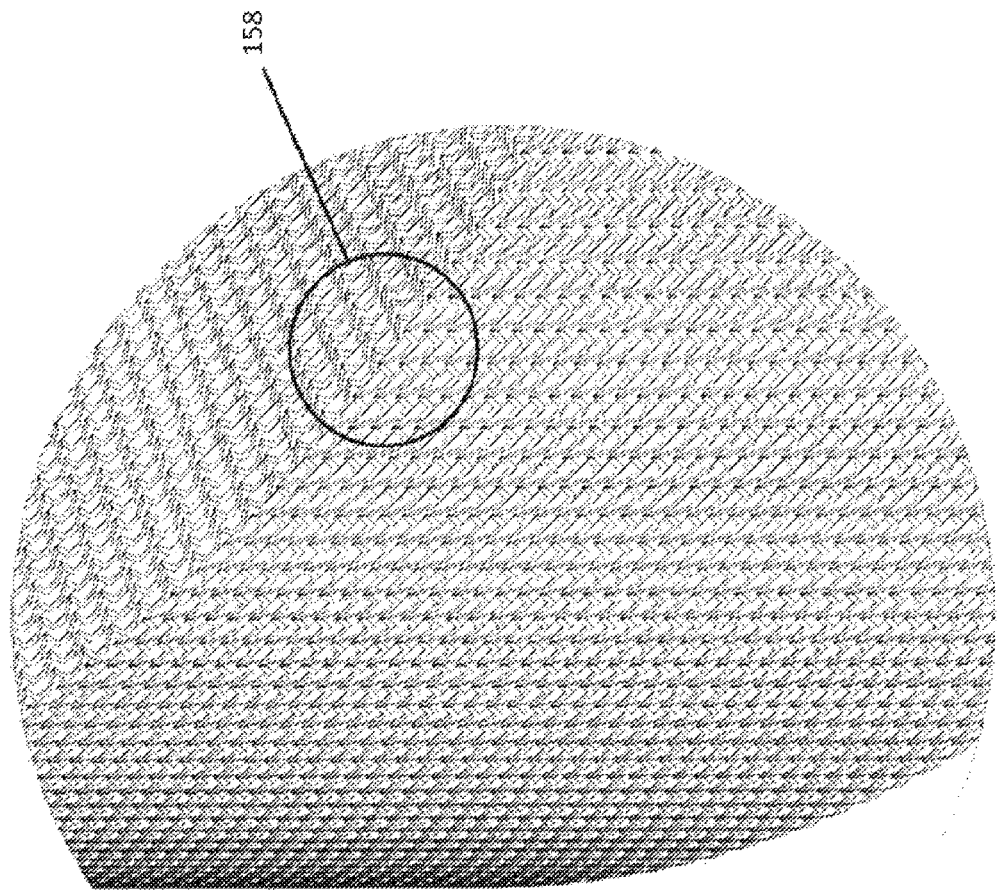
FIG. 24 is a magnified perspective view of an upper corner of the plate pack of FIG. 24.
Figure 25:
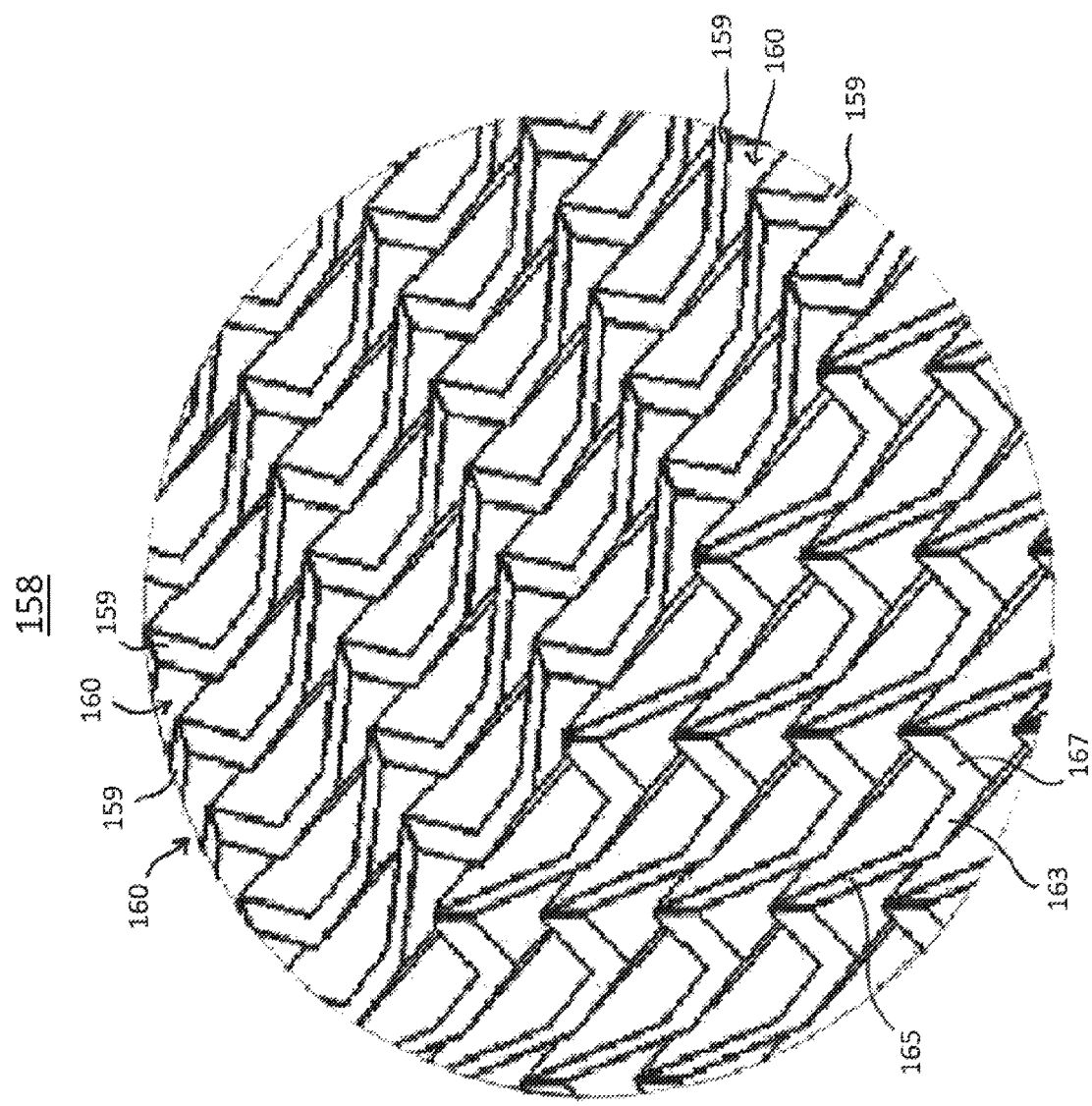
FIG. 25 is a further magnified perspective view of a portion of the upper corner of the magnified plate pack shown in FIG. 24.

FIG. 23 shows a perspective view of an embodiment according to the invention of a plate pack 102 consisting of a cylindrical array 162 of conical coaxial corrugated plates. The configuration of the array 162 is better illustrated in the magnified views of an outer portion 156 of plate pack 102, as indicated in FIG. 24. FIG. 24 shows a first magnified perspective view of the outer portion 156, where an encircled portion 158 of an upper corner of the plate pack 102 is indicated for further magnification. FIG. 25 shows the further magnified perspective view of the encircled portion 158. Array 162 may be described as a combination of the corrugated plates of array 152 arranged in the conical coaxial pattern of array 112. That is, individual plates 159 are formed generally as truncated cones having corrugated surfaces similar in form to the corrugated surfaces in array 152. Multiple cones having similar angles but diminishing diameters are then coaxially arranged to create multiple channels 160 of substantially similar widths throughout the array. Each channel 160 is defined in the space between any two adjacent plates 159. The array 162 of conical coaxial parallel plates 159 provides a filter for trapping and sinking particulates having an angle of repose less than an angle each plate surface forms with respect to horizontal. In one embodiment, that angle is set between about 50 degrees and about 70 degrees.

As shown in FIG. 25, each corrugated surface consists of a recurring pattern of V-shaped or U-shaped troughs, which are formed by a planar base 163 flanked on either side by planar walls 165 and 167 that each project outwardly from the base 163 in diverging directions. In one embodiment, walls 165 and 167 form complementary angles with respect to base 163.

Figure 26:
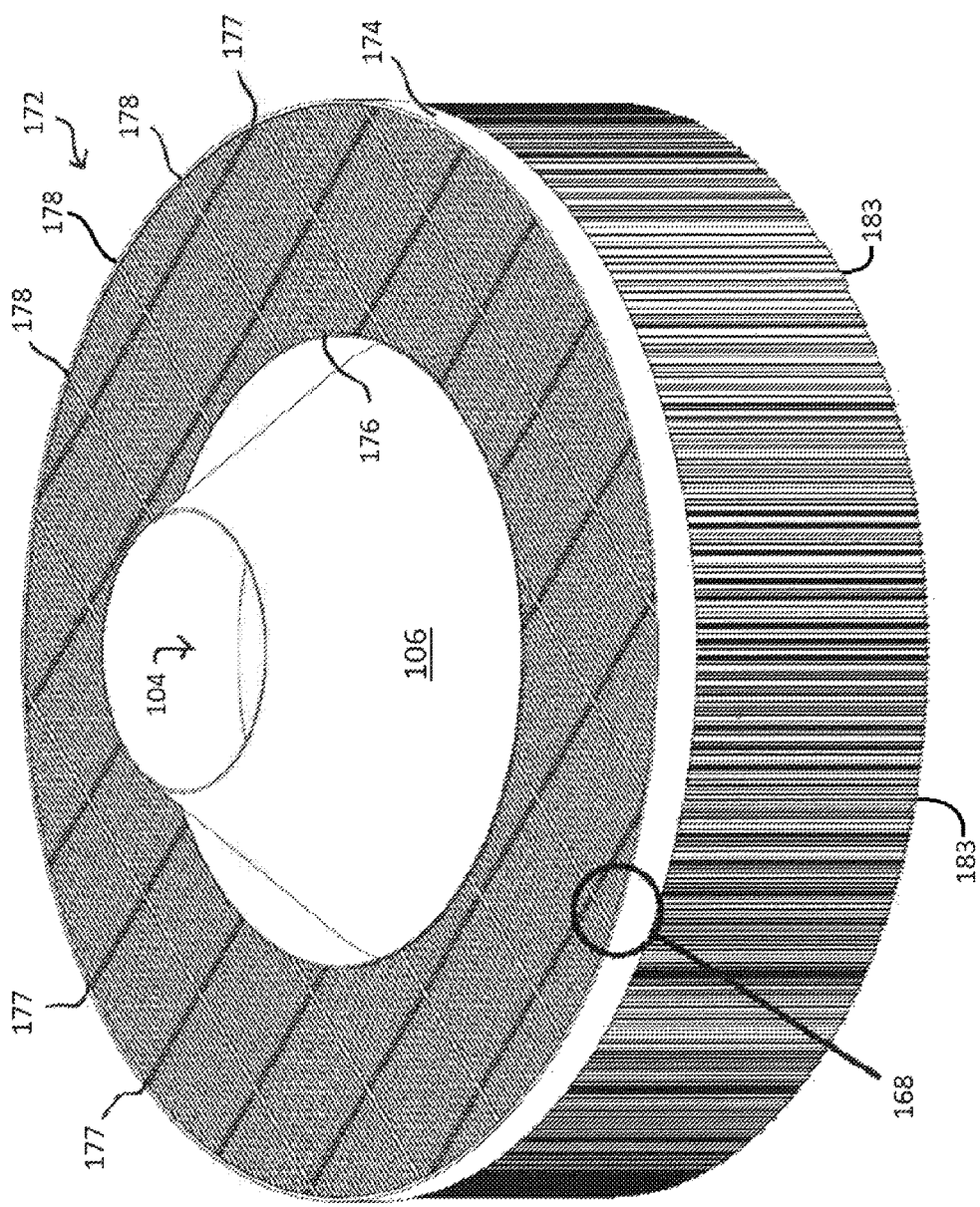
FIG. 26 is a perspective view of one embodiment according to the invention of a dynamic plate pack particulate filter consisting of a cylindrical array of cantilevered parallel vertical blades.
Figure 27:
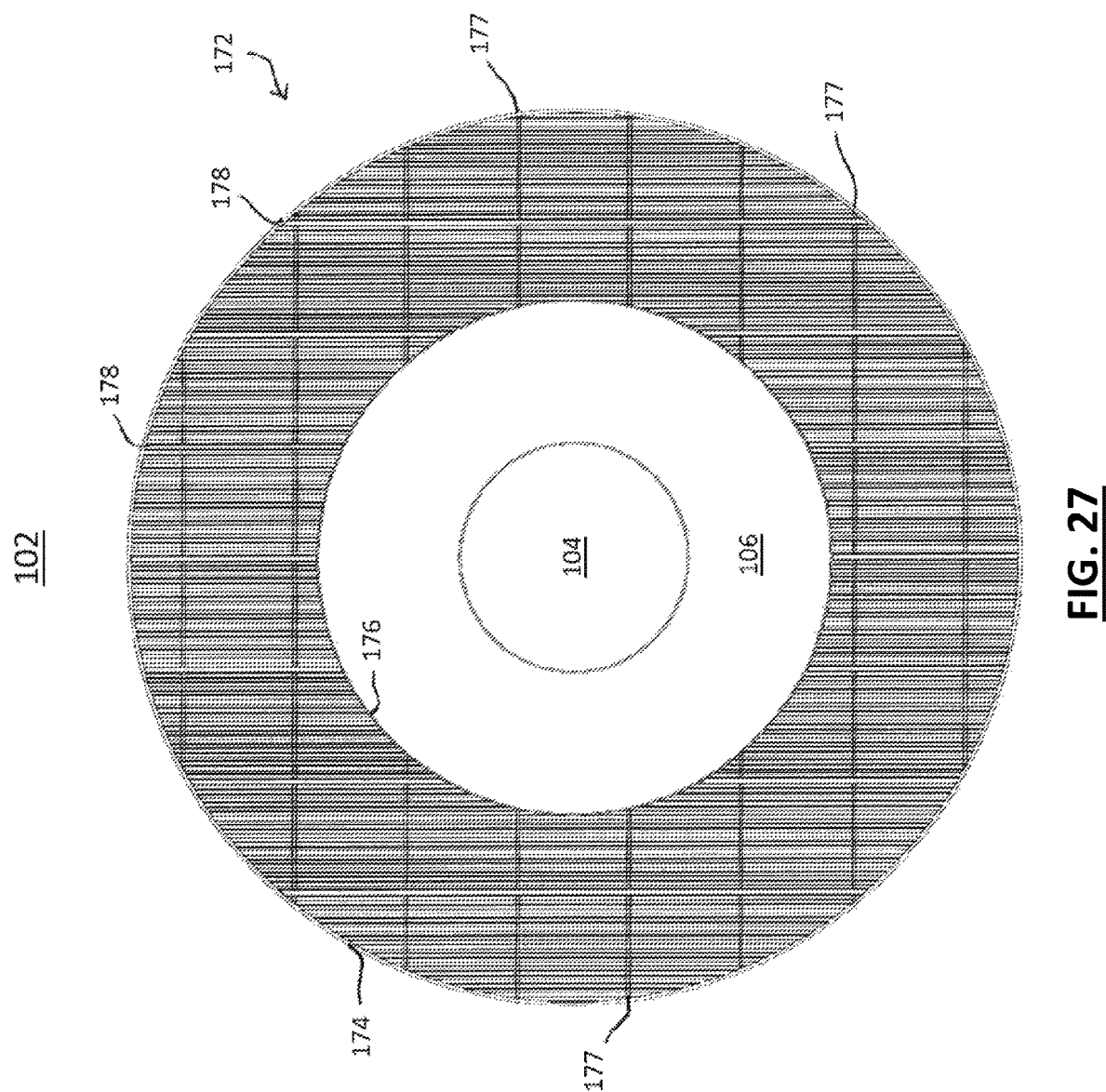
FIG. 27 is a top view of the plate pack of FIG. 26.

FIG. 26 shows a perspective view of an embodiment according to the invention of a plate pack 102 consisting of a cylindrical array 172 of cantilevered parallel vertical blades. FIG. 27 shows a top view of array 172 to better illustrate the rectangular grid-like pattern of plates that is circumscribed within the circular perimeter of the array. In one embodiment, array 172 includes an outer support ring 174, an inner support ring 176, a plurality of bearing bars 177, a plurality of cross bars 178, and a plurality of bladed plates 180. The outer and inner support rings 174, 176 are structural steel members, constructed, for example, from bar or plate stock that is formed into a circle using known fabrication methods. The outer and inner support rings 174, 176 define the outer and inner boundaries of the upper end of cylindrical array 172.

Each bearing bar 177 may comprise a singular, linear length of structural steel that is configured to support one or more bladed plates 180. The bearing bars 177 are arranged parallel to one another and spaced apart at intervals that may be regular intervals. Each bearing bar 177 bisects the circular cross section of the array 172 and attaches at each junction with the outer support ring 174 or inner support ring 176, e.g. by welding each end of the bearing bar thereto. That is, at least one end of each bearing bar 177 is fixed to the outer support ring 174 or to the inner support ring 176, and extends horizontally therefrom.

The cross bars 178 run at right angles to the bearing bars 177 to form a grid. Each cross bar 178 may comprise a singular, linear length of structural steel that is configured to connect to each bearing bar that it intersects, to improve the structural integrity of the grid. The cross bars 178 are arranged parallel to one another and spaced apart at intervals that may be regular intervals. In one embodiment, each interval between cross bars 178 is equivalent in length to each interval between bearing bars 177. Like the bearing bars, each cross bar 178 bisects the circular cross section of the array 172 and attaches at each junction with the outer support ring 174 or inner support ring 176, e.g. by welding each end of the cross bar thereto.

Each bladed plate 180 is suspended from two support members: a bearing bar 177 and either the outer support ring 174, the inner support ring 176, or another bearing bar 177. Each bladed plate 180 hangs from its supporting members so that the planar surfaces of the bladed plate 180 lie in a plane that is oriented substantially parallel to the cross bars 178 and substantially perpendicular to the bearing bars 177. Generally, each bladed plate 180 is configured with a plurality of narrow, flexible bars or blades 183 that are suspended in cantilever fashion so that each individual blade 183 is unrestrained at its lower end. Each blade in the array 172 is therefore free to move or flex, dynamically, primarily in either of two directions (to and fro) parallel to the bearing bars 177 under force of upward flow of particulated water. This configuration of the bladed plate 180 will also allow some amount of twisting and lateral movement of a blade 183 in response to external forces. The array 172 is thus designed to mimic the filtration action of undulating blades of grass that trap and sink tiny airborne particulate matter such as grit and sand that collect in dew drops that form on the grass. As the blades 183 move and flex, the angle that each blade makes with respect to horizontal changes dynamically, to promote the trapping and sinking of particulates having different angles of repose. In one embodiment, blades 183 of each bladed plate 180 each have a length between about 24 inches and about 36 inches, and a thickness of about 10 ga. to 30 ga. to allow for flexibility. The width of each plate 180 will vary according to its placement within the array.

Figure 28:
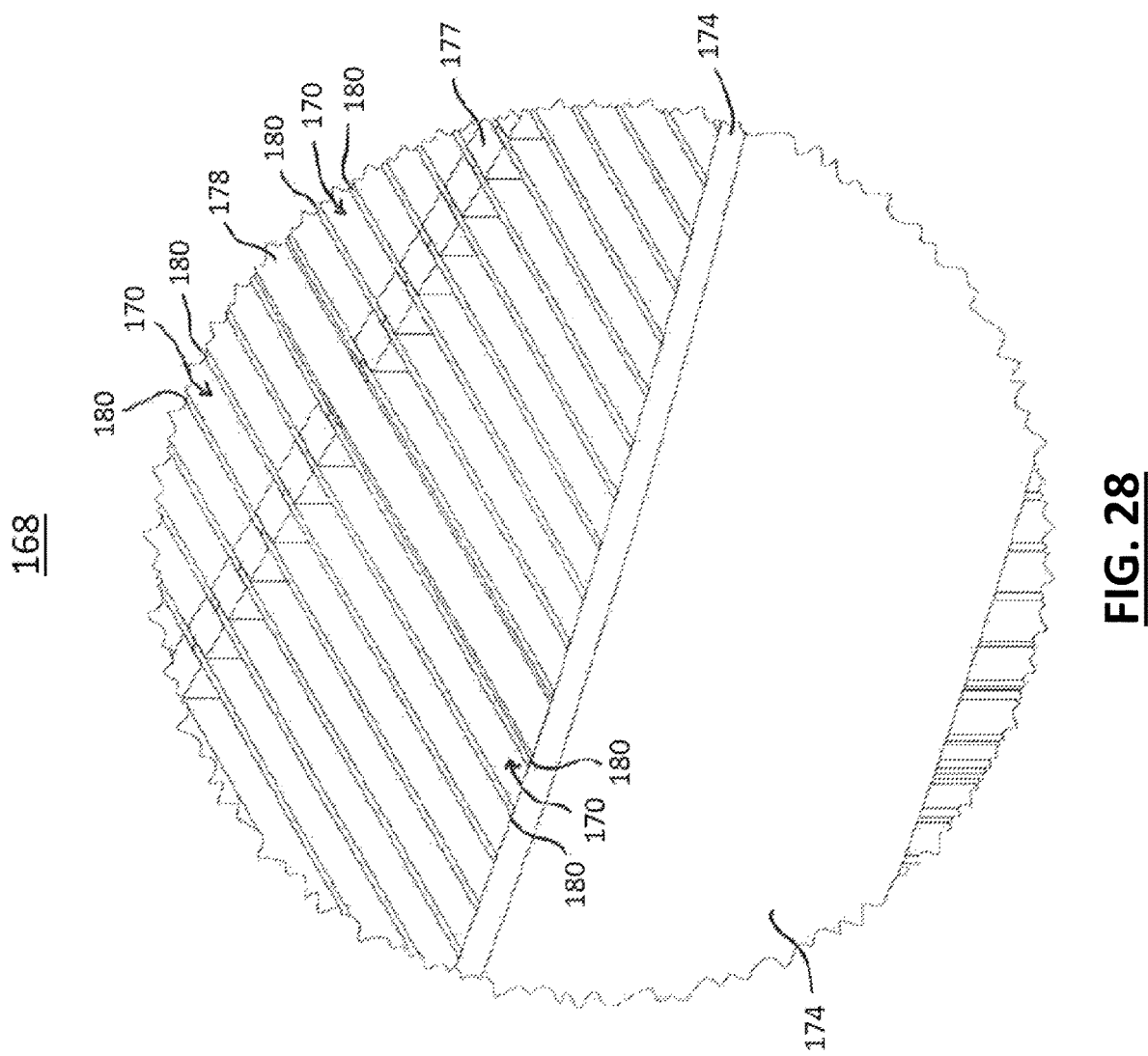
FIG. 28 is a magnified perspective view of an upper corner of the plate pack of FIG. 26.
Figure 29:
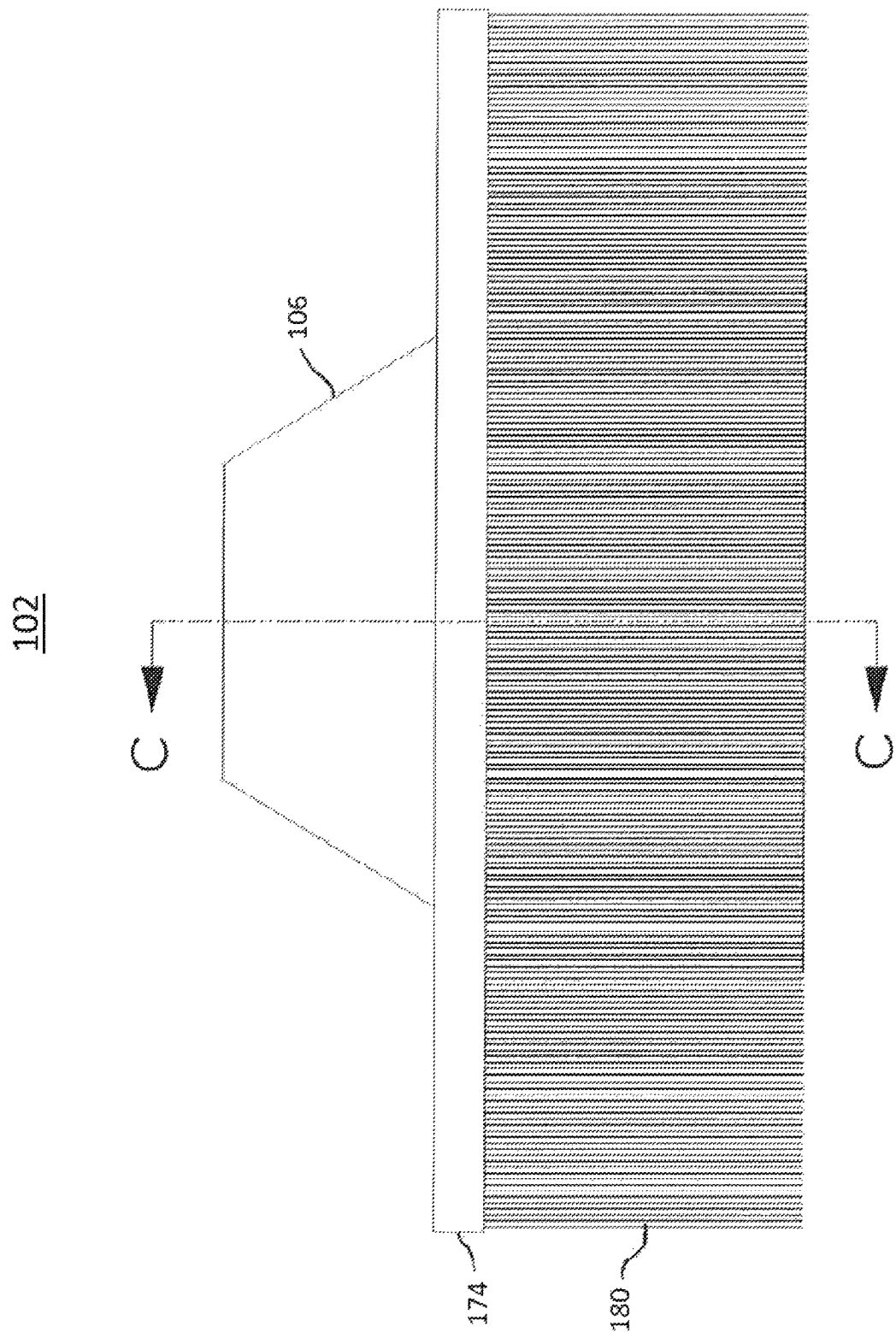
FIG. 29 is a side view of the plate pack of FIG. 26.
Figure 30:
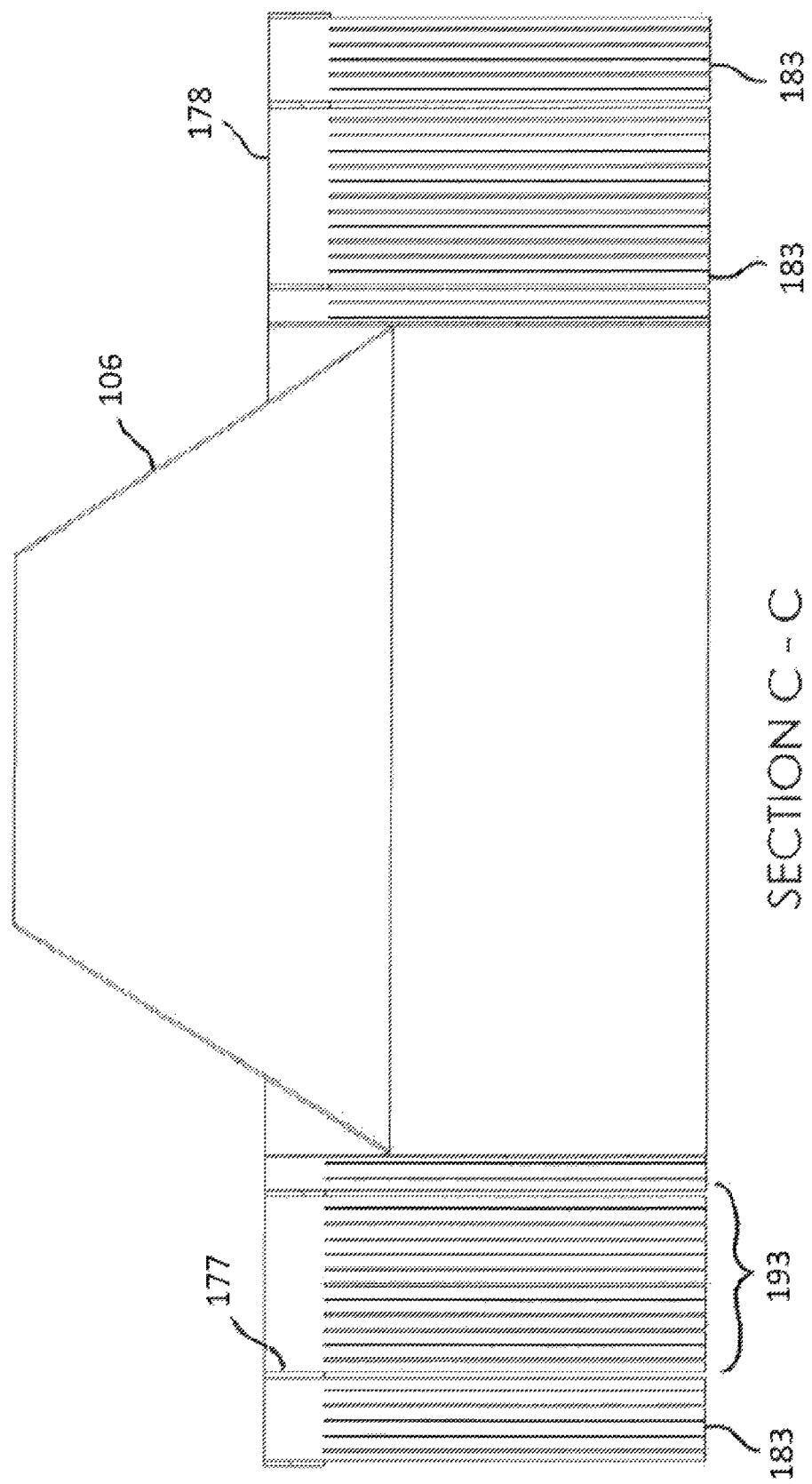
FIG. 30 is a cross sectional view of the plate pack of FIG. 26 taken along section C-C of FIG. 29.

FIGS. 28-30 better illustrates the configuration of cylindrical array 172. FIG. 28 shows a magnified perspective view of an upper corner of the plate pack 102 that is enclosed within the circular portion 168 indicated in FIG. 26. Bladed plates 180 are shown suspended from a bearing bar 177 and outer support ring 174. The bladed plates 180 are separated at intervals (which may be regular intervals) to form channels 170, which, during operation of the plate pack 102, provide a flow path for rising particulated water. In one embodiment, the width of each channel 170 may be between about 0.188 inches and about 0.375 inches. Other channel widths are possible within the scope of the invention, and may be selectively widened or narrowed to optimize filtration according to particulate concentrations. FIG. 29 shows a side view of the cylindrical array 172, to illustrate multiple bladed plates 180 hanging from the outer support ring 174. FIG. 30 shows a cross sectional view of cylindrical array 172 taken along Section C-C, to better illustrate placement of bladed plates 180 with respect to placement of bearing bars 177, cross bars 178, and cone 106.

FIG. 31 shows a side view of one embodiment of a bearing bar 177 according to the invention. The height of each bearing bar may be generally equal to the height of the inner and outer rings 174, 176, which in one embodiment is about 6.0 inches. The length of each bearing bar 177 will vary according to its placement in the cylindrical array 172. As indicated in the figure, the upper edge 179 of bearing bar 177 may be configured with a series of mounting slots configured for engaging one or more cross bars 178 and/or one or more bladed plates 180. Mounting slots 181 are sized to engage with mounting slots 187 of a cross bar 178. Mounting slots 183 are sized to engage with mounting ears 195 of a bladed plate 180. Each mounting slot 181 or 183 is defined through the bearing bar 177 from an upper edge of the bearing bar in a transverse direction to a termination point at the interior of the bearing bar. The length of each mounting slot 181 is preferably about half the height of the bearing bar. The length of each mounting slot 183 may be about ⅔ to ½ the height of the bearing bar. Spacing between mounting slots 181 corresponds to the desired intervals between cross bars 178. Spacing between bladed plates 180 corresponds to the desired width of channels 170. As illustrated in the figure, mounting slots 181 occur less frequently along the length of bearing bar 177 than the occurrence of mounting slots 183. In one embodiment, there are about 20 to 30 mounting slots 183 for every mounting slot 181 along the length of the bearing bar 177.

FIG. 32 shows a side view of one embodiment of a cross bar 178 according to the invention. The height of each cross bar may be generally equal to the height of the bearing bar 177. The length of each cross bar 178 will vary according to its placement in the cylindrical array 172. As indicated in the figure, the lower edge 185 of cross bar 178 may be configured with a series of mounting slots 187 configured for engaging one or more mounting slots 181 in a bearing bar 177. Each mounting slot 187 is defined through the cross bar 178 from a lower edge of the cross bar in a transverse direction to a termination point at the interior of the cross bar. The length of each mounting slot 187 is preferably about half the height of the cross bar. Spacing between mounting slots 187 corresponds to the desired intervals between bearing bars 177. The grid-like pattern of cylindrical array 172 is formed by connecting bearing bars 177 at right angles to cross bars 178 at the slotted locations, so that the mounting slots 187 of each cross bar 178 engage with the mounted slots 181 of each bearing bar 177, thereby aligning cross bars and bearing bars at the same height. Once aligned in this configuration, the cross bars can be welded to the bearing bars at each junction to improve the strength and stability of the array 172. Each end of cross bar 178 may further include an end stem 189 configured to provide a weldable surface for welding to the outer support ring 174 or to the inner support ring 176. In one embodiment, end stem 189 may form a flange.

FIG. 33 shows a side view of one embodiment of a bladed plate 180 according to the invention. Each bladed plate 180 has a haft portion 191 at its upper end, and a bladed portion 193 that extends from the haft portion to the lower end of the bladed plate 180. The haft portion 191 of each bladed plate 180 may be fixed to a bearing bar 177 by means of mounting ears 195 that are formed at each upper corner of the haft portion, as shown. Each mounting ear 195 comprises a relatively short tab of material that projects transversely from each upper corner of the haft portion 191, that is, in a direction perpendicular to the longitudinal direction of the blades 183 so that the maximum width of the bladed plate 180 occurs at the top of the haft portion. Mounting ears 195 are preferably an integral part of the plate material that forms the bladed plate 180. The bladed plate 180 may be attached or suspended between two bearing bars 177 by inserting the mounting ears 195 into opposing mounting slots 183. Once a bladed plate 180 is suspended in this manner, it may be welded in place at the location of the mounting ear engagement. Each bladed plate so installed allows each of its cantilevered blades 183 to move and flex freely, as the lower end of bladed portion 193 remains unrestrained. Bladed plates 180 that border the perimeter of the plate pack 172 may be attached (e.g. by welding or fastening) along the top inner diameter of the outer support ring 174, or along the top outer diameter of the inner support ring 176. In one embodiment, the outer and inner support rings 174, 176 may also be configured with slots 183 for engaging mounting ears 195 of a bladed plate 180.

As shown, the bladed portion 193 includes a plurality of spaced apart, parallel cantilevered blades 183. In one embodiment, each blade 183 has a length of about 24 inches, a width about 1/10 to 1/20 of the spacing between adjacent bearing bars 177, and a thickness between about 10 ga. (~3.5 mm) and 30 ga. (~0.3 mm). The spacing between any two adjacent blades 183 may be commensurate with blade thickness. When all bladed plates 180 are installed, they form within the cylindrical array 172 a plurality of spaced apart, cantilevered parallel vertical blades 183, configured so that when each blade is subjected to hydrodynamic forces of laminar flow, the blades undulate, resulting in blade dynamics that cause the angle of each blade surface with respect to horizontal to vary over a few degrees from 90 as the lower end of each blade moves, twists, and flexes, thereby providing a filter for sinking a wide range of particulates that get trapped at the boundary layer of the blade surface.

It should now be apparent to those of skill in the art that an extrusion system according to the invention equipped with the aforesaid dynamic plate pack allows for filtration of particulated water according to a method that includes the following salient steps: receiving particulated water into a settling tank; directing the particulated water to an elevation beneath a dynamic plate pack; allowing the particulated water to rise between plates of the dynamic plate pack; allowing particulate to settle at a bottom of the settling tank; and extruding settled particulate from the bottom of the settling tank.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A method for separating particulate from water, comprising the following steps:
   receiving particulated water into a settling tank;
   directing the particulated water to an elevation beneath a dynamic plate pack;
   allowing the particulated water to rise between plates of the dynamic plate pack;
   allowing particulate to settle at a bottom of the settling tank; and
   extruding settled particulate from the bottom of the settling tank.

2. The method of claim 1 further comprising sensing settled particulate level above the bottom of the settling tank, and extruding the settled particulate from the bottom of the settling tank responsive to sensing the settled particulate level achieving a predetermined setpoint.

3. The method of claim 2 wherein the sensing step further comprises sensing the settled particulate level at a single location by a displacement sensor.

4. The method of claim 1 wherein the directing step further comprises diffusing the particulated water into multiple transverse flows.

5. The method of claim 4 wherein the diffusing of the particulated water into multiple transverse flows comprises directing a singular vertical flow of the particulated water against a baffle suspended within the settling tank.

6. The method of claim 5 further comprising directing each of the multiple transverse flows through a port located above the baffle.

7. The method of claim 1 wherein the extruding step further comprises actuating an auger that extends vertically along an axis of the settling tank to force the settled particulate through the bottom of the settling tank.

8. The method of claim 1 wherein the dynamic plate pack comprises a cylindrical array of a plurality of cantilevered parallel vertical plates.

\* \* \* \* \*